US012750918B2

(12) United States Patent
Ashraf et al.

(10) Patent No.: US 12,750,918 B2
(45) Date of Patent: Sep. 29, 2026

(54) ALIGNMENT OF DRX CYCLES FOR DOWNLINK COMMUNICATION AND D2D COMMUNICATION

(71) Applicant: Telefonaktiebolaget LM Ericsson (publ), Stockholm (SE)

(72) Inventors: Shehzad Ali Ashraf, Münich (DE); Hieu Do, Järfälla (SE); Ricardo Blasco Serrano, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 323 days.

(21) Appl. No.: 18/572,592

(22) PCT Filed: Jun. 25, 2021

(86) PCT No.: PCT/EP2021/067542
§ 371 (c)(1),
(2) Date: Dec. 20, 2023

(87) PCT Pub. No.: WO2022/268341
PCT Pub. Date: Dec. 29, 2022

(65) Prior Publication Data
US 2024/0373505 A1 Nov. 7, 2024

(51) Int. Cl.
*H04W 76/28* (2018.01)
*H04W 72/0446* (2023.01)
*H04W 72/40* (2023.01)

(52) U.S. Cl.
CPC ....... *H04W 76/28* (2018.02); *H04W 72/0446* (2013.01); *H04W 72/40* (2023.01)

(58) Field of Classification Search
CPC . H04W 72/0446; H04W 72/40; H04W 76/14; H04W 76/28; Y02D 30/70
See application file for complete search history.

(56) References Cited

U.S. PATENT DOCUMENTS 8,583,101 B1 * 11/2013 Xu .................... H04W 52/0216 455/433
9,237,534 B2 * 1/2016 Frye ...................... H04W 56/00
(Continued)

FOREIGN PATENT DOCUMENTS

WO 2022023471 A1 2/2022
WO 2022023472 A1 2/2022

OTHER PUBLICATIONS

3GPP , "3rd Generation Partnership Project; Technical Specification Group Radio Access Network; NR; Medium Access Control (MAC) protocol specification (Release 16)", 3GPP TS 38.321 V16.0.0, Mar. 2020, 1-141.
(Continued)

*Primary Examiner* — Dung B Huynh
(74) *Attorney, Agent, or Firm* — Weisberg I.P. Law, P.A.

(57) ABSTRACT

A wireless communication device (10) configures a first discontinuous reception, DRX, cycle for downlink, DL, communication of the wireless communication device (10) with a wireless communication network. A length of the first DRX cycle is defined in terms of a number of slots in the time domain. Further, the wireless communication device (10) configures a second DRX cycle for device-to-device, D2D, communication performed on resources of at least one resource pool to which a subset of the slots is assigned. A length of the second DRX cycle is defined in terms of a number of the slots from the at least one resource pool. Further, the wireless communication device (10) sets the length of the first DRX cycle and the length of the second DRX cycle under the condition that, for consecutive time periods of fixed length, each time period contains an integer number of the first DRX cycles and an integer number of the second DRX cycles.

16 Claims, 15 Drawing Sheets

(56) References Cited

U.S. PATENT DOCUMENTS 10,334,525 B1 * 6/2019 Govindassamy ........ H04W 52/0219
10,856,224 B2 * 12/2020 Nigam .............. H04W 52/0216
12,477,541 B2 * 11/2025 Di Girolamo .... H04W 72/1263
12,513,778 B2 * 12/2025 Liu ....................... H04W 76/28
2007/0066300 A1 * 3/2007 Nishimura ............. G08C 17/02 455/462
2008/0285509 A1 * 11/2008 Womack ............... H04W 76/28 370/329
2009/0168797 A1 * 7/2009 Danielson ............. H04J 3/1682 370/458
2010/0157953 A1 * 6/2010 Christoffersson ..... H04W 72/23 370/336
2010/0260169 A1 * 10/2010 Gheorghiu ............ H04J 3/0638 370/350
2010/0272004 A1 * 10/2010 Maeda .................. H04L 5/0007 370/312
2011/0211455 A1 * 9/2011 Nakaoka ........... H04W 74/0816 370/329
2011/0237231 A1 * 9/2011 Horneman ........ H04W 52/0216 455/414.1
2012/0147755 A1 * 6/2012 Chen ....................... H04L 5/005 370/242
2012/0236920 A1 * 9/2012 Ben-Eli ............. H04W 52/0235 375/226
2013/0028098 A1 * 1/2013 Yuda ................... H04W 52/028 370/241
2013/0242832 A1 * 9/2013 Koc ...................... H04L 1/1607 370/311
2014/0073372 A1 * 3/2014 Lee ......................... H04W 4/10 455/518
2014/0106747 A1 * 4/2014 Josso .................... H04W 68/00 455/435.2
2014/0286215 A1 * 9/2014 Koc ...................... H04W 28/24 370/311
2014/0348046 A1 * 11/2014 Feng ..................... H04W 76/28 370/311
2015/0304910 A1 * 10/2015 Moogi .................. H04W 76/28 455/436
2015/0327325 A1 * 11/2015 Koivisto ............... H04W 76/27 370/350
2016/0044654 A1 * 2/2016 Dalsgaard ............. H04W 76/28 370/329
2016/0044740 A1 * 2/2016 Siomina ................ H04W 72/02 455/552.1
2016/0198407 A1 * 7/2016 Höglund ................. H04W 4/06 370/311
2016/0212723 A1 * 7/2016 Yu ..................... H04W 56/0015
2017/0303235 A1 * 10/2017 Deogun .............. H04W 68/005
2017/0339745 A1 * 11/2017 Uchino ................. H04W 76/28
2018/0042068 A1 * 2/2018 Sebire ................... H04W 28/18
2019/0306828 A1 * 10/2019 Kim .................... H04W 72/046
2019/0320490 A1 * 10/2019 Liu .................. H04W 52/0216
2020/0344722 A1 * 10/2020 He ........................ H04L 5/0055
2021/0051588 A1 * 2/2021 Wu ..................... H04W 56/001
2021/0059005 A1 * 2/2021 Hosseini ............... H04W 76/28
2021/0105677 A1 * 4/2021 Jang ...................... H04W 76/28
2021/0195519 A1 * 6/2021 Sridharan ......... H04W 52/0235
2021/0234657 A1 * 7/2021 Miao ..................... H04W 24/08
2021/0289474 A1 * 9/2021 Wang ................ H04W 72/0446
2021/0314919 A1 * 10/2021 Kwak ............... H04W 72/0446
2021/0360731 A1 * 11/2021 He ........................ H04W 76/27
2022/0015186 A1 * 1/2022 Jeong .................... H04L 1/1896
2022/0030661 A1 * 1/2022 Jeong .................... H04W 72/20
2022/0046648 A1 * 2/2022 Kiilerich Pratas .... H04W 48/16
2022/0053340 A1 * 2/2022 Ryu ...................... H04W 76/28
2022/0070779 A1 * 3/2022 Li ......................... H04W 76/14
2022/0070965 A1 * 3/2022 Li ......................... H04W 76/28
2022/0095280 A1 * 3/2022 Farag .................... H04W 72/02
2022/0159752 A1 * 5/2022 Farag .................... H04W 76/14
2022/0191829 A1 * 6/2022 Sarkis ...................... H04W 4/40
2022/0217740 A1 * 7/2022 Park .......................... H04L 5/00
2022/0225468 A1 * 7/2022 Chae ..................... H04L 5/0094
2022/0272789 A1 * 8/2022 Wang .................... H04W 76/14
2022/0295442 A1 * 9/2022 Goyal ................... H04W 64/00
2022/0330147 A1 * 10/2022 Sarkis ................. H04W 56/001
2022/0353945 A1 * 11/2022 Liu ........................ H04W 76/28
2022/0353948 A1 * 11/2022 Luo ....................... H04W 76/28
2022/0361281 A1 * 11/2022 Paris ..................... H04W 76/28
2022/0377831 A1 * 11/2022 Li .......................... H04W 76/14
2022/0394810 A1 * 12/2022 Hong .................... H04W 72/23
2022/0417854 A1 * 12/2022 Park ................. H04W 52/0235
2022/0417991 A1 * 12/2022 Farag ................ H04W 74/0808
2023/0014303 A1 * 1/2023 Di Girolamo ........ H04W 76/28
2023/0026332 A1 * 1/2023 Fan ....................... H04W 76/28
2023/0064488 A1 * 3/2023 Han ...................... H04W 76/28
2023/0066041 A1 * 3/2023 Guo ................. H04W 52/0216
2023/0066448 A1 * 3/2023 Tseng .................... H04W 72/20
2023/0082194 A1 * 3/2023 Liu .................. H04W 52/0216
2023/0098973 A1 * 3/2023 Yang ..................... H04W 72/25 370/312
2023/0164816 A1 * 5/2023 Hwang ................. H04L 1/1816 370/330
2023/0189391 A1 * 6/2023 Luo ....................... H04W 76/28 370/329
2023/0209649 A1 * 6/2023 Liu ....................... H04W 76/28 370/329
2023/0217417 A1 * 7/2023 Cheng ................... H04L 5/0032 370/329
2023/0224733 A1 * 7/2023 Sterzbach ............ H04W 24/06 455/438
2023/0269614 A1 * 8/2023 Chen ...................... H04B 17/17 370/252
2023/0292395 A1 * 9/2023 Han ...................... H04W 76/14
2023/0300742 A1 * 9/2023 He .................... H04W 52/0216 370/311
2023/0308245 A1 * 9/2023 Hwang ............ H04W 72/0446
2023/0328840 A1 * 10/2023 Cheng ................... H04L 5/0082 370/329
2023/0337319 A1 * 10/2023 Luo ................... H04W 52/0219
2023/0345577 A1 * 10/2023 Yu ........................ H04W 76/28
2023/0354470 A1 * 11/2023 Chae ................ H04W 52/0216
2023/0362896 A1 * 11/2023 Wu ....................... H04W 72/02
2023/0363044 A1 * 11/2023 Chae ..................... H04W 72/40
2023/0371050 A1 * 11/2023 Van Phan ............ H04W 72/40
2023/0389045 A1 * 11/2023 Ko ........................ H04W 72/25
2023/0397295 A1 * 12/2023 Salim ................ H04W 52/0216
2024/0064644 A1 * 2/2024 Zhao ................ H04W 72/0446
2024/0064855 A1 * 2/2024 Wu ....................... H04W 72/25
2024/0080805 A1 * 3/2024 Lee ...................... H04B 17/328
2024/0089991 A1 * 3/2024 Zhao ..................... H04W 76/28
2024/0098815 A1 * 3/2024 Freda .................... H04W 76/14
2024/0138001 A1 * 4/2024 Höglund ........... H04W 52/0274
2024/0147572 A1 * 5/2024 Dass ..................... H04W 72/21
2024/0172325 A1 * 5/2024 Adjakple .............. H04W 88/02
2024/0236994 A1 * 7/2024 Park ...................... H04W 76/14
2024/0349392 A1 * 10/2024 Luo ....................... H04W 24/08
2024/0373500 A1 * 11/2024 Buthler ............. H04W 28/0268
2024/0381345 A1 * 11/2024 Qiao ................ H04W 56/0015
2025/0048397 A1 * 2/2025 Ding ..................... H04W 72/02
2026/0089626 A1 * 3/2026 Dutta ................ H04W 52/0216
2026/0113720 A1 * 4/2026 Dutta .................... H04W 56/00

OTHER PUBLICATIONS

3GPP, "3rd Generation Partnership Project; Technical Specification Group Radio Access Network; NR; Physical layer procedures for data (Release 16)", 3GPP TS 38.214 V16.5.0, Mar. 2021, 1-171.

3GPP, "3rd Generation Partnership Project; Technical Specification Group Radio Access Network; NR; Radio Resource Control (RRC) protocol specification (Release 16)", 3GPP TS 38.331 V16.4.1, Mar. 2021, 1-949.

3GPP, "3rd Generation Partnership Project; Technical Specification Group Radio Access Network; NR; Study on NR Vehicle-to-Everything (V2X) (Release 16)", 3GPP TR 38.885 V16.0.0, Mar. 2019, 1-122.

Unknown, Author, "Alignment between SL DRX and Uu DRX", Ericsson, Qualcomm Incorporated; 3GPP TSG-RAN WG2 #113bis-e, R2-2103004, Electronic Meeting, Apr. 12, 2021-Apr. 20, 2021, 1-4.

(56) References Cited

OTHER PUBLICATIONS

Unknown, Author , "Alignment between Uu DRX and SL DRX", Huawei, HiSilicon; 3GPP TSG-RAN WG2 Meeting #113 electronic, R2-2101764, Jan. 25-Feb. 5, 2020, 1-6.
Unknown, Auhtor , "Discussion on alignment of Uu DRX and SL DRX", Apple; 3GPP TSG-RAN WG2 Meeting #113e, R2-2100864, Online, Jan. 25-Feb. 5, 2020, 1-4.
Unknown, Author , "New WID on NR sidelink enhancement", 3GPP TSG RAN Meeting #86, RP-193231, (revision of RP-193134), Sitges, Spain, Dec. 9-12, 2019, 1-6.
Unknown, Author , "On coordination between Uu DRX and SL DRX", Qualcomm Incorporated; 3GPP TSG RAN WG2 Meeting #113-e, R2-2101247, E-Conference, Jan. 25-Feb. 5, 2021, 1-4.
Unknown, Author , "Summary of [706]", Ericsson; 3GPP TSG-RAN WG2 #113bis-e R2-2104472, E-meeting, Apr. 2021, 1-18.

* cited by examiner

FIG. 1
DRX cycle
Active Time
Inactive time
time

ALIGNMENT OF DRX CYCLES FOR DOWNLINK COMMUNICATION AND D2D COMMUNICATION

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019 March). In the NR technology, also more targeted V2X services are considered, by supporting also groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice. Furthermore, NR sidelink communication supports D2D communication of UEs with and without network coverage, with varying degrees of interaction between the UEs and the network, including the possibility of standalone, network-less operation.

Further potential use cases of D2D communication include NSPS (National Security and Public Safety), Network Controlled Interactive Service (NCIS), and Gap Analysis for Railways. In order to provide a wider coverage of NR sidelink for such use cases, further enhancements of the NR sidelink technology are being considered. One of such enhancements is power saving which enables UEs with battery constraint to perform sidelink operations in a power efficient manner. For example, 3GPP work item description "NR Sidelink Enhancement", document RP-193231, TSG RAN Meeting #86 (2019 December), suggests investigation of sidelink Discontinuous Reception (DRX) operation for broadcast, groupcast, and unicast transmission modes, aiming at definition of sidelink DRX configurations and procedures for implementing sidelink DRX in UEs, including mechanisms to align sidelink DRX configurations among the UEs communicating with each other, and mechanisms to align sidelink DRX configurations with DRX configurations for downlink (DL) communication via the Uu radio interface.

For the NR technology, DRX procedures for via the Uu radio interface are specified in 3GPP TS 38.321 V16.0.0 (2020 March). When configured, the DRX functionality controls the expected UE behavior in terms of reception and processing of transmissions. The DRX functionality is based on defining an "Active Time", also referred to as Active Time state or ACTIVE state, in which the UE is expected to receive and process incoming transmissions. For example, in the Active Time, the UE is typically expected to decode the DL control channels, process grants, or the like. When the UE is not in Active Time, also denoted as "Inactive Time", there is no expectation on the UE receiving and processing transmissions. Accordingly, an access node, in the NR technology denoted as "gNB" cannot assume that the UE will be listening to DL transmissions. A DRX configuration may be regarded as defining transitions between states, in particular the Active Time and the Inactive Time. During the Inactive Time, the UE may turn off some of its components and enter a low-power mode, also denoted as sleeping mode. To ensure that the UE switches regularly to Active Time, i.e., wakes up, a DRX cycle is defined. The DRX cycle may be controlled by two parameters: a periodicity of the DRX cycle, which controls how frequently the UE switches to Active Time, and a duration of the Active Time. Such basic DRX cycle in schematically illustrated in FIG. 1. In FIG. 1, the Active Times of the DRX cycle are illustrated by solid blocks.

In addition to the basic DRX cycle, the DRX procedures also define other conditions that may allow the UE to switch between Active Time and Inactive Time. For example, if a UE is expecting a retransmission from the gNB, the UE may enter Inactive Time while the gNB prepares the retransmission and then may enter Active Time during a time window in which the gNB is expected to send the transmission.

In the NR technology, radio resources for SL communication are organized in an SL resource pool which consists of radio resources spanning both time and frequency domain. In the frequency domain, the SL resource pool is divided into multiple subchannels, or subbands, with each subchannel consisting of a number of contiguous resource blocks. An SL transmission typically uses an integer number of subchannels. In the time domain, the SL resource pool consists of time slots indexed in an ascending order, starting from index 0 up to a maximum index value. Once this maximum index value is reached, the slot indexing is started again from index 0, and so on. An upper bound of the maximum index value is determined via typically configured at $10240*2^{\mu}-1$, where p is a scaling factor which depends on subcarrier spacing. As a result, the indices of the slots in the SL resource pool repeat in a periodic manner. In the following, the term "physical slots" is also used to denote the time-domain slots in general, while those slots which belong to a SL resource pool are denoted as "logical slots". Details concerning the determination of the logical slots, i.e., the slots which belong to the SL resource pool, are specified in 3GPP TS 38.214 V16.5.0 (2021 March).

Typically, the DRX cycle in the Uu DRX configuration is defined in terms of absolute time, e.g., in milliseconds. Such absolute time can be directly mapped to physical slots. However, it is not desirable to define the SL DRX cycles in the same way, because not all physical slots can be used for SL transmissions so that it could happen that the Active Time of the SL DRX cycle includes only few logical slots or even no logical slot. On the other hand, when defining the SL DRX cycle in terms of logical slots, alignment of the Uu DRX cycle and the SL DRX cycle is not straightforward, specifically when considering that certain physical slots are counted in the Uu DRX cycle but are not part of SL resource pool and hence not counted in the SL DRX cycle. Such slots may include DL slots, reserved slots, slots for SL synchronization signals, or slots in where a number of available uplink (UL) symbols is lower than a threshold. This may in turn result in misalignment of the Uu DRX cycle and the SL DRX cycle. FIG. 2 schematically illustrates an example of such misalignment. In the example of FIG. 2, a time-division duplex (TDD) pattern defines whether a slot is a DL slot (D) or a UL slot (U). A bitmap, in the illustrated example given by "110011100" is used to assign some of the UL slots to a SL resource pool. These logical slots are marked by cross-hatching. Dotted elliptic lines mark regions where the Uu DRX cycle and the SL DRX cycle are misaligned.

Accordingly, there is a need for techniques which allow for improving alignment of a DRX cycle for DL communication and a DRX cycle for SL communication or other types of D2D communication.

SUMMARY

According to an embodiment, a method of controlling D2D communication is provided. According to the method, a wireless communication device configures a first discontinuous reception (DRX) cycle for downlink (DL) communication of the wireless communication device with a wireless communication network. A length of the first DRX cycle is defined in terms of a number of slots in the time domain. Further, the wireless communication device configures a second DRX cycle for device-to-device (D2D) communication performed on resources of at least one resource pool to which a subset of the slots is assigned. A length of the second DRX cycle is defined in terms of a number of the slots from the at least one resource pool. Further, the wireless communication device sets the length of the first DRX cycle and the length of the second DRX cycle under the condition that, for consecutive time periods of fixed length, each time period contains an integer number of the first DRX cycles and an integer number of the second DRX cycles.

According to a further embodiment, a method of controlling D2D communication is provided. According to the method, a node of a wireless communication network configures a wireless communication device with a first DRX cycle for downlink communication with the wireless communication network and a second DRX cycle for D2D communication. A length of the first DRX cycle is defined in terms of a number of slots in the time domain. The D2D communication is performed on resources of at least one resource pool to which a subset of the slots is assigned. A length of the second DRX cycle is defined in terms of a number of the slots from the at least one resource pool. Further, the node sets the length of the first DRX cycle and the length of the second DRX cycle under the condition that, for consecutive time periods of fixed length, each time period contains an integer number of the first DRX cycles and an integer number of the second DRX cycles.

According to a further embodiment, a wireless communication device is provided. The wireless communication device is configured to configure a first DRX cycle for DL communication of the wireless communication device with a wireless communication network. A length of the first DRX cycle is defined in terms of a number of slots in the time domain. Further, the wireless communication device is configured to configure a second DRX cycle for D2D communication performed on resources of at least one resource pool to which a subset of the slots is assigned. A length of the second DRX cycle is defined in terms of a number of the slots from the at least one resource pool. Further, the wireless communication device is configured to set the length of the first DRX cycle and the length of the second DRX cycle under the condition that, for consecutive time periods of fixed length, each time period contains an integer number of the first DRX cycles and an integer number of the second DRX cycles.

According to a further embodiment, a wireless communication device is provided. The wireless communication device comprises at least one processor and a memory. The memory contains instructions executable by said at least one processor, whereby the wireless communication device is operative to configure a first DRX cycle for DL communication of the wireless communication device with a wireless communication network. A length of the first DRX cycle is defined in terms of a number of slots in the time domain. Further, the memory contains instructions executable by said at least one processor, whereby the wireless communication device is operative to configure a second DRX cycle for D2D communication performed on resources of at least one resource pool to which a subset of the slots is assigned. A length of the second DRX cycle is defined in terms of a number of the slots from the at least one resource pool. Further, the memory contains instructions executable by said at least one processor, whereby the wireless communication device is operative to set the length of the first DRX cycle and the length of the second DRX cycle under the condition that, for consecutive time periods of fixed length, each time period contains an integer number of the first DRX cycles and an integer number of the second DRX cycles.

According to a further embodiment, a node for a wireless communication network is provided. The node is configured to configure a wireless communication device with a first DRX cycle for downlink communication with the wireless communication network and a second DRX cycle for D2D communication. A length of the first DRX cycle is defined in terms of a number of slots in the time domain. The D2D communication is performed on resources of at least one resource pool to which a subset of the slots is assigned. A length of the second DRX cycle is defined in terms of a number of the slots from the at least one resource pool. Further, the node is configured to set the length of the first DRX cycle and the length of the second DRX cycle under the condition that, for consecutive time periods of fixed length, each time period contains an integer number of the first DRX cycles and an integer number of the second DRX cycles.

According to a further embodiment, a node for a wireless communication network is provided. The node comprises at least one processor and a memory. The memory contains instructions executable by said at least one processor, whereby the node is operative to configure a wireless communication device with a first DRX cycle for downlink communication with the wireless communication network and a second DRX cycle for D2D communication. A length of the first DRX cycle is defined in terms of a number of slots in the time domain. The D2D communication is performed on resources of at least one resource pool to which a subset of the slots is assigned. A length of the second DRX cycle is defined in terms of a number of the slots from the at least one resource pool. Further, the memory contains instructions executable by said at least one processor, whereby the node is operative to set the length of the first DRX cycle and the length of the second DRX cycle under the condition that, for consecutive time periods of fixed length, each time period contains an integer number of the first DRX cycles and an integer number of the second DRX cycles.

According to a further embodiment of the invention, a computer program or computer program product is provided, e.g., in the form of a non-transitory storage medium, which comprises program code to be executed by at least one processor of a wireless communication device. Execution of the program code causes the wireless communication device to configure a first DRX cycle for DL communication of the wireless communication device with a wireless communication network. A length of the first DRX cycle is defined in terms of a number of slots in the time domain. Further, execution of the program code causes the wireless communication device to configure a second DRX cycle for D2D communication performed on resources of at least one resource pool to which a subset of the slots is assigned. A length of the second DRX cycle is defined in terms of a number of the slots from the at least one resource pool. Further, Execution of the program code causes the wireless communication device to set the length of the first DRX cycle and the length of the second DRX cycle under the condition that, for consecutive time periods of fixed length, each time period contains an integer number of the first DRX cycles and an integer number of the second DRX cycles.

According to a further embodiment of the invention, a computer program or computer program product is provided, e.g., in the form of a non-transitory storage medium, which comprises program code to be executed by at least one processor of a node for a wireless communication network. Execution of the program code causes the node to configure a wireless communication device with a first DRX cycle for downlink communication with the wireless communication network and a second DRX cycle for D2D communication. A length of the first DRX cycle is defined in terms of a number of slots in the time domain. The D2D communication is performed on resources of at least one resource pool to which a subset of the slots is assigned. A length of the second DRX cycle is defined in terms of a number of the slots from the at least one resource pool. Further, execution of the program code causes the node to set the length of the first DRX cycle and the length of the second DRX cycle under the condition that, for consecutive time periods of fixed length, each time period contains an integer number of the first DRX cycles and an integer number of the second DRX cycles.

Details of such embodiments and further embodiments will be apparent from the following detailed description of embodiments.

DETAILED DESCRIPTION OF EMBODIMENTS

Figure 1:
FIG. 1 schematically illustrates a DRX cycle.
Figure 2:
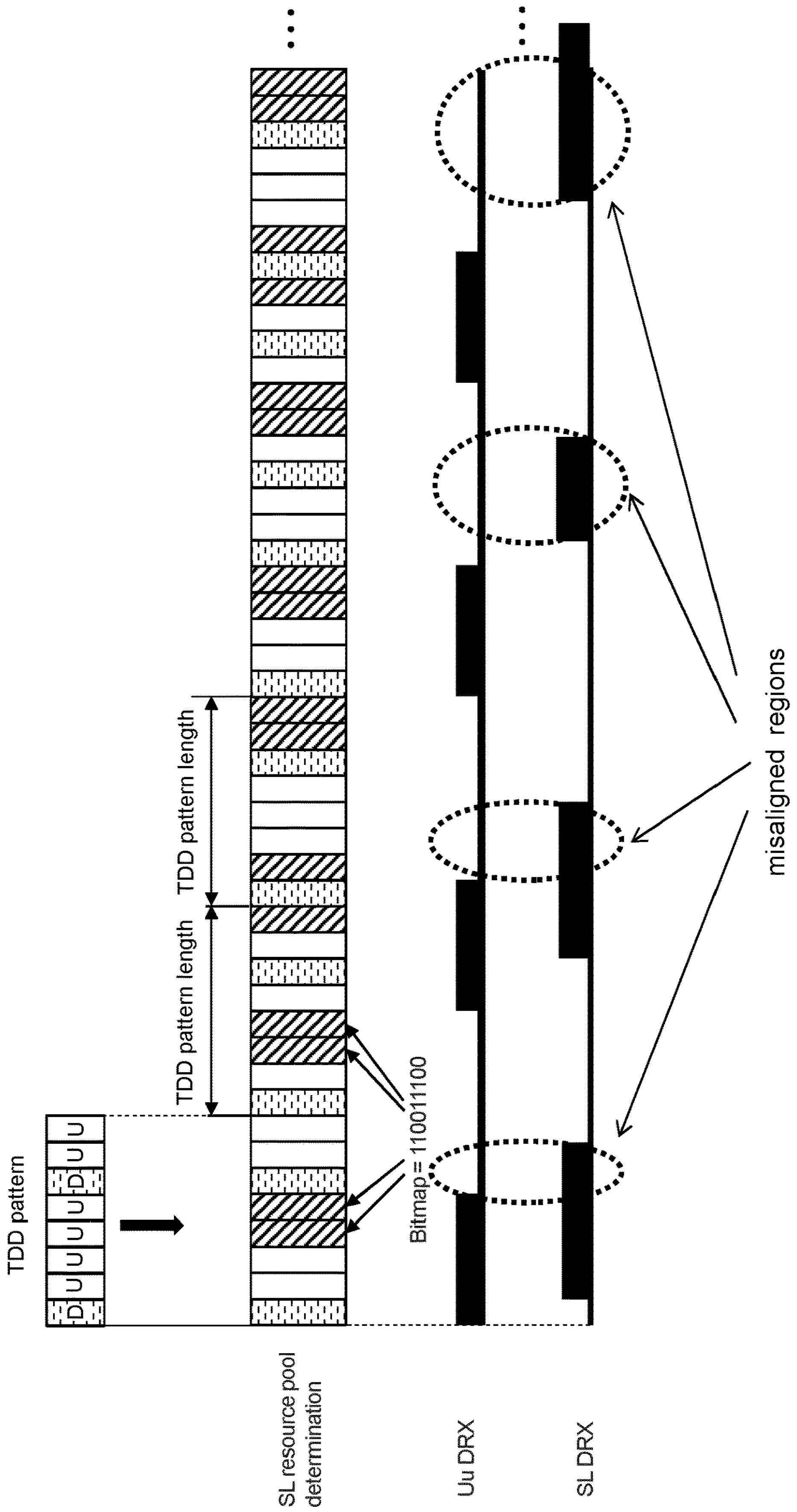
FIG. 2 schematically illustrates an example of misalignment of a Uu DRx cycle and an SL DRX cycle.

In the following, concepts in accordance with exemplary embodiments of the invention will be explained in more detail and with reference to the accompanying drawings. The illustrated embodiments relate to controlling of D2D communication by wireless communication devices. These wireless communication devices may include various types of UEs or other wireless devices (WDs). As used herein, the term “wireless device” (WD) refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP, e.g., on the PC5 SL interface of the LTE or NR technology. However, it is noted that the illustrated concepts could also be applied to other radio technologies, e.g., a WLAN (Wireless Local Area Network) technology.

In the illustrated concepts, D2D communication may be performed in an energy efficient manner by using procedures and mechanisms which enable efficient DRX operation for both DL communication and for D2D communication. In particular, the illustrated concepts allow for a higher degree of alignment of a first DRX cycle for DL communication, which is defined in absolute time and thus based on physical slots, and a second DRX cycle for D2D communication, which is defined based on a subset of the physical slots, namely those physical slots which are assigned to one or more resource pools configured for D2D communication. The enhanced alignment allows for further reducing the Active Time of the wireless device communication device which applies the DRX cycles for DL communication and D2D communication and thus better exploiting potential power savings.

In the illustrated concepts, the enhanced alignment is achieved by defining certain constraints on the length of the first DRX cycle and the second DRX cycle. In particular, the length of the first DRX cycle and the length of the second DRX cycle may be set under the condition that, for consecutive time periods of fixed length, each time period contains an integer number of the first DRX cycles and an integer number of the second DRX cycles. Further, the lengths may be set such that, for each first DRX cycle over a certain time period, the number of the slots assigned to the resource pool remains the same. In some cases, the lengths may be set in such a way that a time duration of the second DRX cycle is an integer multiple of a time duration of the first DRX cycle. In other cases, the lengths may be set in such a way that a time duration of the first DRX cycle is an integer multiple of a time duration of the second DRX cycle. In still further cases, the lengths may be set in such a way that a time duration of the first DRX cycle is an integer multiple of a time duration of the second DRX cycle plus an additive term. The additive term may depend on a configuration of reserved slots, which are not available to be assigned to the resource pool(s), e.g., slots reserved for transmission of synchronization signals, e.g., SL synchronization signals (SLSS) or SL synchronization signal blocks (S-SSB).

Figure 3:
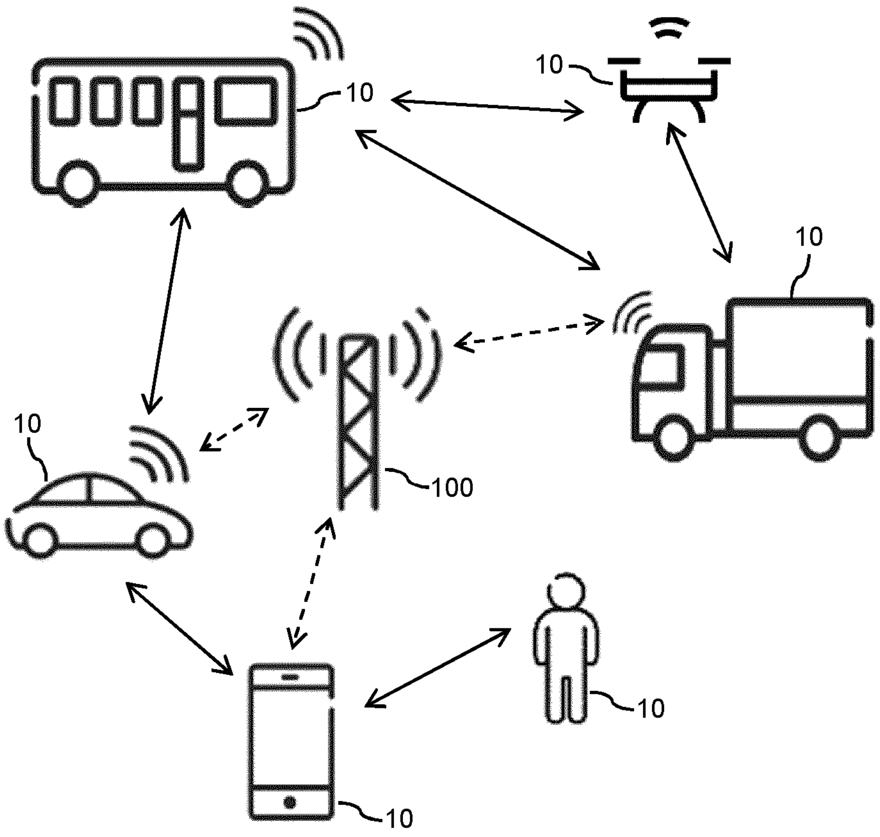
FIG. 3 schematically illustrates an exemplary V2X scenario in which D2D communication may be controlled according to an embodiment of the invention.

FIG. 3 illustrates an exemplary scenario involving V2X communications. In particular, FIG. 3 shows various UEs 10, which may engage in V2X communication or other D2D communication, illustrated by solid arrows. Further, FIG. 3 shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs 10 illustrated in FIG. 3 comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 3 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device. The V2X communication may also involve utilizing the illustrated mechanisms and procedures to enable DRX operation for the V2X communication between the UEs 10, thereby improving energy efficiency of the V2X communication.

Figure 4:
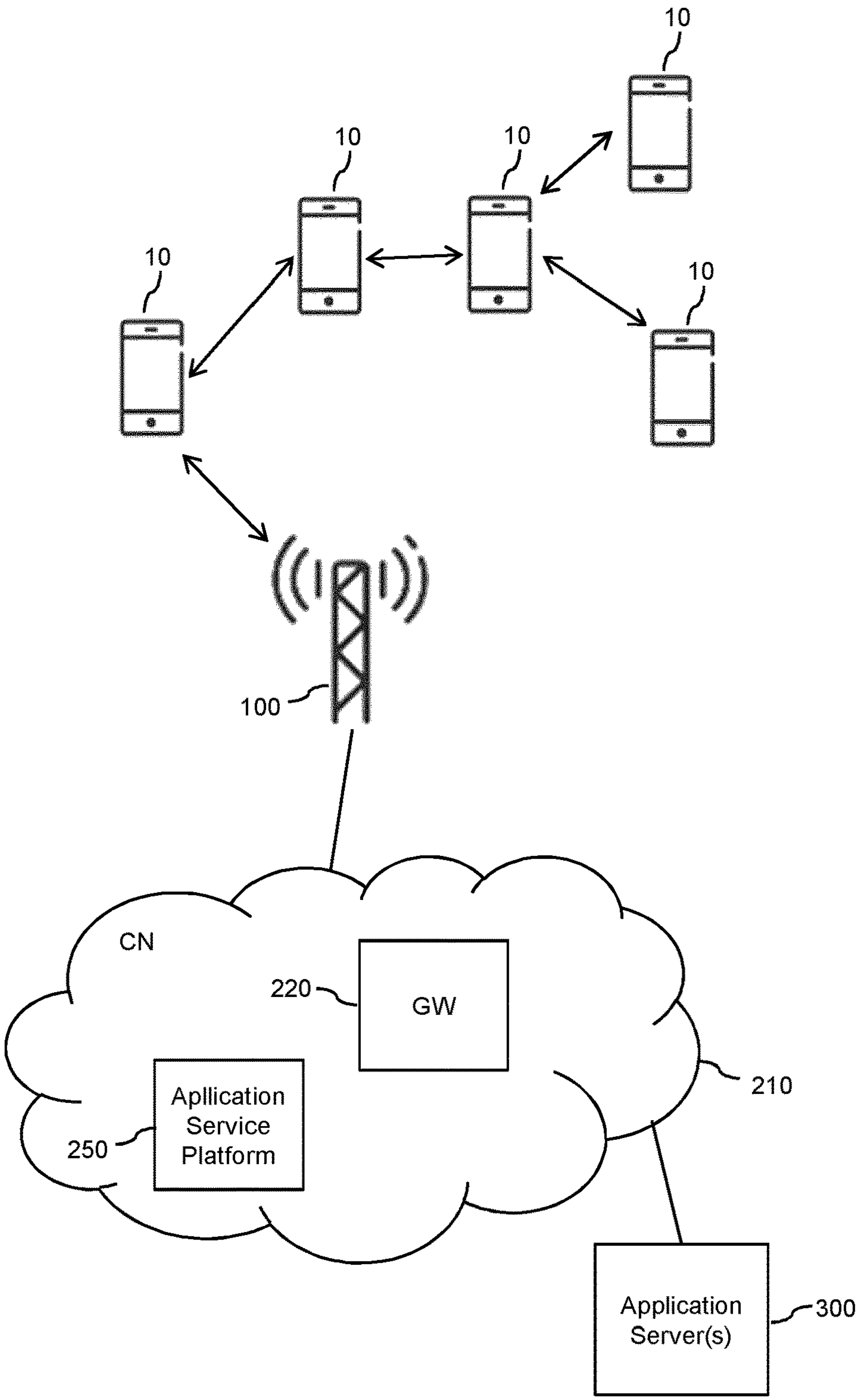
FIG. 4 schematically illustrates an exemplary scenario according to an embodiment of the invention, in which D2D communication may be controlled according to an embodiment of the invention.

FIG. 4 illustrates an exemplary D2D communication scenario. In particular, FIG. 4 shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 4 shows a core network (CN) 210 of the wireless communication network. The CN 210 may provide connectivity of the UEs 10 to other data networks, e.g., through a GW 220 provided in the CN 210. Further, the CN 210 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, an NSPS service, and/or an NCIS service. Such services may be based on applications which are executed on the UE 10 and/or on a device linked to the UE 10. Accordingly, in the illustrated concepts a D2D transmission may convey or correspond to a V2X message, an ITS message, or some other kind of message related to a service. Further, FIG. 4 illustrates an application service platform 250 in the CN 210 of the wireless communication network. Further, FIG. 4 illustrates one or more application servers 300 provided outside the wireless communication network. The application(s) executed on the UE 10 and/or on one or more other devices linked to the UE 10 may use the radio links with one or more other UEs 10, the application service platform 250, and/or the application server(s) 300, thereby enabling the corresponding service(s) on the UE 10. In some scenarios, the services utilized by the UEs 10 may thus be hosted on the network side, e.g., on the application service platform 250 or on the application server(s) 300. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network. The application service platform 250 and the server(s) 300 may also be regarded as host computer which hosts a service provided by an application executed on the UE 10 and utilizes DL transmissions, UL transmissions, and/or D2D transmissions. Also in the scenario of FIG. 4, the UEs 10 may apply the DRX operation to the D2D communication to improve energy efficiency.

In the example of FIG. 4, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 3.

As mentioned above, in some scenarios the D2D communication to which the DRX operation is applied may be based on the SL mode of the NR or LTE technology, using the PC5 radio interface. In such cases the SL communication may be based on multiple physical channels defined on a physical (PHY) layer of the radio interface between the TX UE and the RX UE, including a Physical sidelink control channel (PSCCH), a Physical sidelink shared channel (PSSCH), a Physical sidelink feedback channel (PSFCH), and a Physical sidelink broadcast channel (PSBCH). The data decoded from the PHY layer may then be further processed by an MAC (Medium Access Control) entity of the RX UE.

The PSCCH carries only control information, usually referred to as the first-stage SCI (Sidelink Control Information). It is transmitted using a predefined format in predetermined radio resources, allowing a RX UE to use blind decoding. That is, a RX UE attempts to decode PSCCH according to the predefined format in the predetermined radio resources, without knowing beforehand whether a PSCCH was indeed transmitted or not. If the decoding operation succeeds, the RX UE assumes that a PSCCH was transmitted. Otherwise, it assumes no PSCCH was transmitted. The PSCCH carries information that is necessary to decode the PSSCH.

The PSSCH carries both control information and data payload. The control information is usually referred to as the second-stage SCI. It is transmitted using the radio resource allocation and transmission format indicated in PSCCH. It contains further information that is necessary to decode the data payload carried by PSSCH too.

The PSFCH carries only feedback information. The contents of PSFCH depends on the mode of HARQ operation. In some cases, both positive (also denoted as ACK) and negative (also denoted as NACK) acknowledgements are transmitted. In other cases, only NACK is transmitted. PSFCH transmission uses a predefined format and takes place in predetermined radio resources.

The PSBCH carries basic system configuration information, e.g., concerning bandwidth, TDD (time-division duplexing) configuration, or the like. Further, the PSBCH carries synchronization signals, e.g., SLSS or S-SSB.

In the following, the illustrated concepts will be explained in more detail in the context of an exemplary deployment, assuming that the first DRX cycle applies to DL communication is via the NR Uu interface and the second DRX cycle applies to SL communication via the NR PC5 SL interface. As used herein, the term "logical slot(s)" denoted slot(s) which are used for the transmission of SL data and/or control information, and are part of SL resource pool. The term "physical slot(s)" denotes slot(s) in the time domain which also constitute a basic time unit of the system. These physical slots can correspond to the slots specified in the NR technology. A certain physical slot may be or may not be part of an SL resource pool. In other words, the logical slots may be selected from the physical slots and form a subset of the physical slots. The term "Uu DRX cycle" corresponds to the first DRX cycle and denotes a time period which is used for discontinuous reception of DL traffic. The Uu DRX cycle is defined in absolute time, e.g., in milliseconds or seconds, and this absolute time directly translates into a number of physical slots. Accordingly, the Uu DRX cycle may be regarded as being defined by a number or physical slots. The term "SL DRX cycle" corresponds to the second DRX cycle and denotes a time period which is used for discontinuous reception of SL traffic and is defined based on logical slots. In the illustrated concepts, a logical slot can be a slot that can be selected for SL communication, in particular, a slot from a resource pool or a slot from a resource pool of a plurality of resource pools.

The selection of the logical slots may be accomplished based on a bitmap, as specified in 3GPP TS 38.214 V16.5.0 (2021 March), namely based on the following procedure:

The set of slots that may belong to an SL resource pool is denoted by slot indices $$(t_0^{SL}, t_1^{SL}, \ldots, t_{T_{max}-1}^{SL}), \text{ where } 0 \le t_i^{SL} < 10240 \times 2^{\mu},\ 0 \le i < T_{max}.$$

The slot index is relative to slot #0 of the radio frame corresponding to SFN (System Frame Number) 0 of the serving cell or DFN (Direct Frame Number) 0. The set includes all physical slots except the following slots:

- $N_{S\_SSB}$ slots configured for transmission of S-SS or S-SSB/PSBCH,
- $N_{nonSL}$ in each of which at least one of y-th, (y+1)-th, . . . , (y+x−1)-th OFDM (Orthogonal Frequency Division Multiplexing) symbols are not semi-statically configured as UL. The configuration of OFDM symbols as UL is based on a higher layer parameter tdd-UL-DL-ConfigurationCommon-r16 of the serving cell if provided or sl-TDD-Configuration-r16 if provided or sl-TDD-Config-r16 of the received PSBCH if provided, where Y and X are set by the higher layer parameters sl-StartSymbol and sl-LengthSymbols, respectively.

Reserved slots.

The remaining slots excluding $N_{S\_SSB}$ slots and $N_{nonSL}$ slots from the set of all the physical slots are denoted by $(l_0, l_1, \ldots, l_{(10240\times 2^{\mu}-N_{S_{SSB}}-N_{nonSL}-1)})$ arranged in increasing order of slot index. A slot $l_r$ $(0 \le r < 10240\times 2^{\mu}-N_{S_{SSB}}-N_{nonSL})$ belongs to the reserved slots if $$r = \left\lfloor \frac{m \cdot (10240 \times 2^{\mu} - N_{S_{SSB}} - N_{nonSL})}{N_{reserved}} \right\rfloor,$$

where m=0, 1, . . . , $N_{reserved}-1$ and $N_{reserved}=(10240\times 2^{\mu}-N_{S_{SSB}}-N_{nonSL}) \bmod L_{bitmap1} \cdot L_{bitmap1}$ denotes the length of a bitmap configured by higher layers, which is used for determining the reserved slots.

The slots in the set are arranged in increasing order of slot index.

The set of slots assigned to an SL resource pool are then determined as follows:

A bitmap $(b_0, b_1, \ldots, b_{L_{bitmap2}-1})$ for determination of the SL resource pool is determined, where $L_{bitmap2}$ denotes the length of the bitmap. The bitmap is configured by higher layers.

A slot $$t_k^{SL}(0 \le k < 10240 \times 2^{\mu} - N_{S_{SSB}} - N_{nonSL} - N_{reserved})$$

belongs to the set if $b_{k'}=1$ where $k'=k \bmod L_{bitmap}$.

The slots in the set are re-indexed such that the subscripts i of the remaining slots $$t_i'^{SL}$$

are successive {0, 1, . . . , $T'_{max}-1$}, where $T'_{max}$ is the number of the slots remaining in the set.

Accordingly, the SL resource pool may be determined by taking all physical slots within a period of 10240 ms, excluding the slots used for SL-SS and PSBCH, excluding slots unusable for SL communication, e.g., DL slots or slots with too few UL symbols, which may be based on a TDD configuration, and excluding some reserved slots. The number of remaining slots is a multiple of a bitmap length. The bitmap is a sequence of bits 0 or 1. The bitmap is applied to the above remaining slots. Each slot corresponding to a bit value 1 in the bitmap is determined as being part of the SL resource pool, i.e., as a logical slot.

In some scenarios, multiple SL resource pools can be configured. Then, a corresponding bitmap may be configured per resource pool and the physical slots assigned to each SL resource pool may be determined based on the corresponding bitmap, using the above procedure. Such different SL resource pools may for example be assigned to different applications or services and/or may be assigned to different casting modes, such as different casting modes selected from unicast, groupcast, and broadcast.

The NR technology was designed to work on both paired frequency bands, where separated frequency ranges are assigned for UL and DL, and unpaired bands with a single shared frequency range for UL and DL. Paired bands are used for Frequency Division Duplex (FDD) operation, while unpaired bands are used for Time Division Duplex (TDD) operation. To support TDD operation, the NR physical slots or symbols are assigned to the UL and DL according to a TDD DL-UL Pattern Configuration, hereafter called TDD configuration or TDD pattern. The TDD configuration can be defined in a flexible way using several parameters, e.g., as specified in 3GPP TS 38.331 V16.4.1 (2021 March). These parameters include: DL-UL transmission periodicity in ms, reference subcarrier spacing to calculate the number of slots in the DL-UL pattern, number of consecutive full DL slots at the beginning of each DL-UL pattern, number of consecutive DL symbols in the beginning of the slot following the last full DL slot, number of consecutive full UL slots at the end of each DL-UL pattern, and number of consecutive UL symbols in the end of the slot preceding the first full UL slot. Accordingly, a certain slot can be used either for DL or for UL or for both DL and UL. The last type of slot is often referred to as flexible slot and has some symbols used for DL and some other symbols for UL. When determining the logical slots forming the SL resource pool as described in above, the DL slots and the slots whose number of symbols that can be used for UL is less than a certain threshold, e.g., corresponding to the above parameter y, may be excluded from the set of slots that may be used for SL, i.e., may be determined as $N_{nonSL}$ slots.

In the illustrated concepts, different types of alignment of the SL DRX cycle and the Uu DRX cycle can be distinguished, which in the following are denoted as “Alignment Type 1”, “Alignment Type 2”, and “Quasi-Alignment”.

Figure 5A:
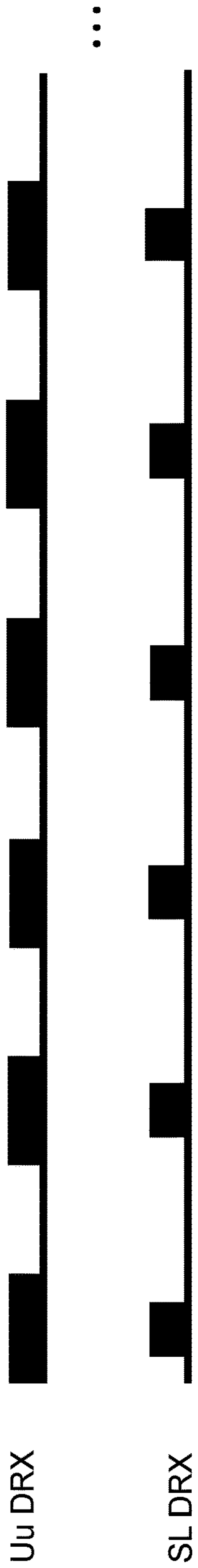
FIGS. 5A, 5B, 5C, and 5D schematically illustrate examples of alignment of a Uu DRx cycle and an SL DRX cycle according to embodiments of the invention.

In the case of Alignment Type 1, the SL DRX active time lies within, or completely or at least partially overlaps, the Uu DRX active time. An example of Alignment Type 1 is illustrated in FIG. 5A. Similar to FIG. 1, the DRX active times of both DRX cycles are illustrated by solid blocks. As can be seen from FIG. 5A, the DRX active times of the SL DRX cycle each lie within an active time of the Uu DRX cycle.

Figure 5B:
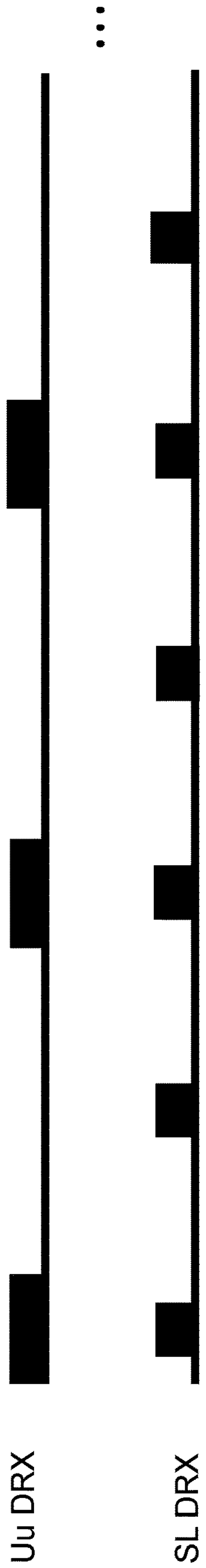

For Alignment Type 1, it may also happen that there are multiple SL DRX cycles within a Uu DRX cycle. In this case, the overlap of the active time of the SL DRX cycle and the active time of the Uu DRX cycle can remain the same within each Uu DRX cycle. FIG. 5B illustrates a corresponding example. As can be seen from FIG. 5B, not necessarily every active time of the SL DRX cycle lies within or overlaps with an active time of the Uu DRX cycle.

Figure 5C:
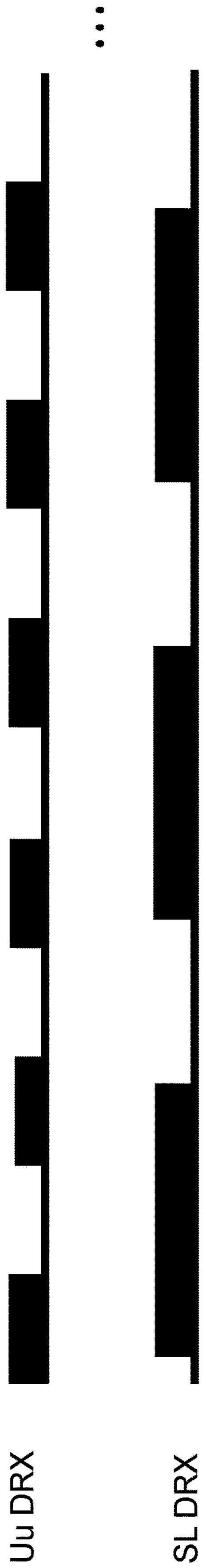

For Alignment Type 1, it may also happen that there are multiple Uu DRX cycles within a SL DRX cycle. In this case, the overlap of the active time of the SL DRX cycle and the active time of the Uu DRX cycle can remain the same within each SL DRX cycle. FIG. 5C illustrates a corresponding example.

Figure 5D:
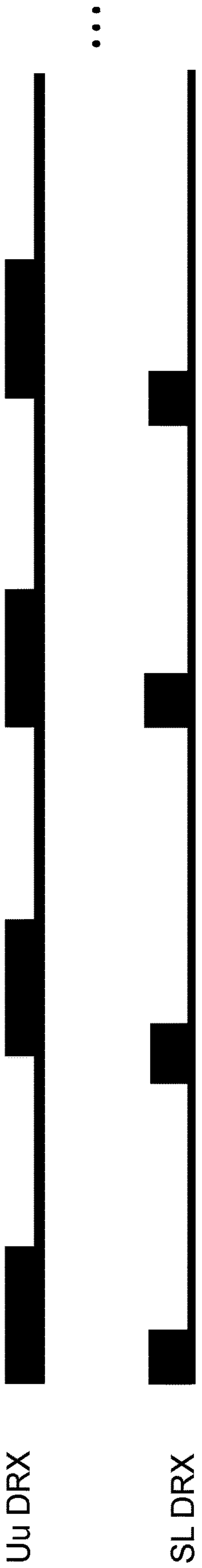

In the case of Alignment Type 2, the SL DRX and Uu DRX cycles form patterns over a certain time period, e.g., an SFN period or a DFN period, but the active times of the SL DRX cycle and are not necessarily, and not completely, overlapping with the active times of the Uu DRX cycle. FIG. 5D illustrates a corresponding example.

In some cases, a strict alignment of the SL DRX and Uu DRX cycles like explained for Alignment Type 1 and Alignment Type 2 is not possible, e.g., due to resources in certain slots being reserved and thus not available for the SL resource pool. For example, SLSS and/or S-SSB may be transmitted every T slots or ms, e.g., every 160 ms. The resources used for these transmissions are not part of the SL resource pool and the corresponding slots would thus not be counted as logical slots. The presence of such reserved slots, which are not available for the SL resource pool, shift the position of the next logical slots in absolute time. For example: without such additional transmissions, using a SL resource pool defined by bitmap of length 160 with all bits set to 1 would result in all slots being SL logical slots. With SLSS transmission every 160 ms, the same bitmap results in the logical slots with the following physical slot indices: [0, . . . , 159, 161, . . . 320, 322, . . . , 481, 483, . . . ]. That is, physical slots 160, 321, 482, etc. are not counted as logical slots. A similar situation may take place if some physical slots are reserved for the purpose of aligning the SL bitmap length with the SFN cycle length. In particular, some physical slots may be reserved for ensuring that the SL bitmap length is repeated an integer number of times within the SFN cycle length. If the only misalignment between the SL DRX cycle and the Uu DRX cycle is due to the presence of such reserved slots, the SL DRX cycle and the Uu DRX cycle are herein regarded as quasi-aligned.

In the illustrated concepts, alignment of the SL DRX cycle and the Uu DRX cycle according to Alignment Type 1, Alignment Type 2, or Quasi-Alignment can be achieved by defining a configuration of the length of the SL DRX cycle and the Uu DRX cycle such that the number of logical slots within the Uu DRX cycle remains the same for each Uu DRX cycle and/or every consecutive time period 'P' contains an integer number of Uu DRX cycles and an integer number of SL DRX cycles.

The configuration can be defined by setting the length of the Uu DRX cycle (in terms of physical slots) to k*X, where; k is a first multiplicative factor and X is a period, setting the length of the bitmap for determining the logical slots of the SL resource pool to n*Y, where n is a second multiplicative factor and Y is the number of slots which can be used for SL transmissions within the period X, and setting the length of the SL DRX cycle length (in terms of logical slots) to m*Z, where m is a third multiplicative factor and Z is the number of bits with value 1 in the configured bitmap. For example, if the bitmap is configured as [1 1 0 0 1], then the length of the SL DRX cycle would configured to as m*3.

In some scenarios, the period X may correspond to the length of the TDD pattern or to the DL-UL transmission periodicity. The period X may be pre-configured, e.g., according to a standard, or may be configured based on information signalled to the UE, e.g., in RRC (Radio Resource Control) signalling. In some cases, the period X could be pre-configured in some other way, e.g., based on operator settings or manufacturer settings.

In some scenarios, the multiplicative factors k, n, m are integer numbers. In some scenarios, the multiplicative factors k, n, m are fractional numbers. In some scenarios, the multiplicative factor k is chosen such that $k*X \leq P$. Here; P may for example be the period of the SFN, which typically is 10240 ms, or the period of the DFN. Alternatively, P could have some other pre-configured or pre-defined value.

In one example, the multiplicative factors k, n, and m are chosen such that there are N1 Uu DRX cycles within each period P and N2 SL DRX cycles within each period P, where N1 and N2 are integers and depend on k, n, and m. Also here; P may for example be the period of the SFN, which typically is 10240 ms, or the period of the DFN. Alternatively, P could have some other pre-configured or pre-defined value.

In some cases, the multiplicative factors k, n, and m are selected in such a way that the start of the SL DRX cycle and the start of the Uu DRX cycle coincide one or more times within the certain period P. For example, assuming that the Uu DRX cycle has length k*X and the bitmap has a length n*Y, and that the start of the Uu DRX cycle and the start of the bitmap coincide in slot s, then they coincide again in slots s+LCM(k,n), s+2*LCM(k,n), s+3*LCM(k,n), etc., where LCM(k,n) is the least common multiple of k and n.

In some cases, the multiplicative factors k, n, and m are equal. Alternatively, at least two of the three multiplicative factors k, n, and m are unequal.

In some scenarios, if for some Uu DRX cycles the number of logical slots within the Uu DRX cycle varies due to the configuration of resources for transmission of SLSS and/or S-SSB, or due to the configuration of resources that are reserved for other purposes, quasi-alignment may be achieved by requiring that the length of some SL DRX cycles (in terms of to absolute time or physical slots) is equal to the length of the Uu DRX cycle multiplied by multiplicative factor plus an additive term. The additive term may depends on the configuration of resources for transmission of SLSS or S-SSB or on the configuration of resources that are reserved for other purpose.

FIGS. 6 to 9 illustrated examples of alignments based on the above concepts. In these examples, a TDD pattern defines whether a slot is a DL slot (D) or a UL slot (U). A bitmap, is used to assign some of the UL slots to a SL resource pool. These logical slots are marked by crosshatching.

Figure 6:
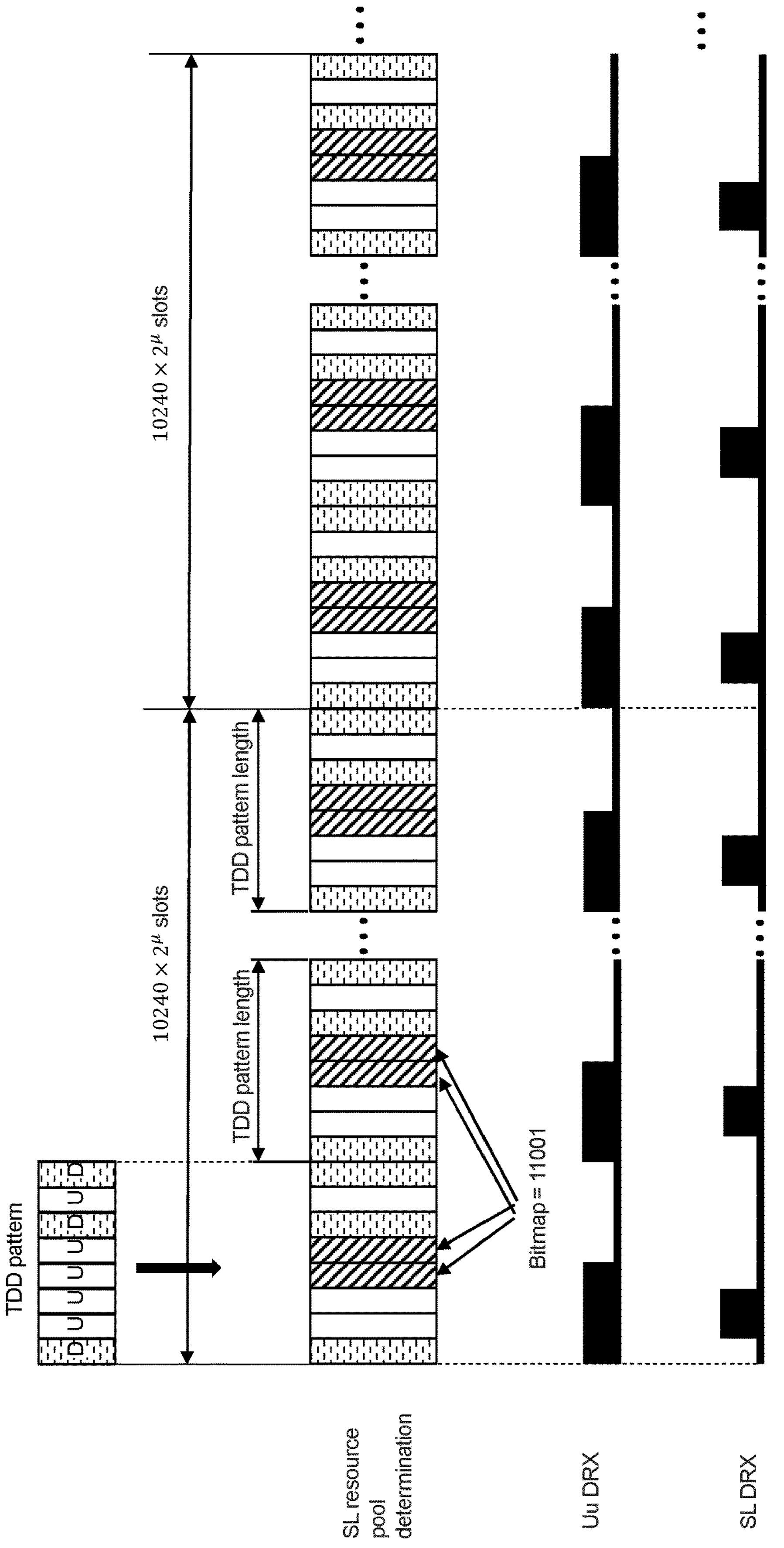
FIGS. 6, 7, 8, and 9 schematically illustrate further examples of alignment of a Uu DRx cycle and an SL DRX cycle according to embodiments of the invention.

In the example illustrated by FIG. 6, k=n=m=1, X=8 corresponds to the length of the TDD pattern, and P is the SFN period of 10240 ms. The TDD pattern is "DUUUUDUD", and the bitmap for determining the slots of the SL resource pool is "11001". As can be seen, with these parameters the SL DRX cycle and the Uu DRX cycle are aligned according to Alignment Type 1.

Figure 7:
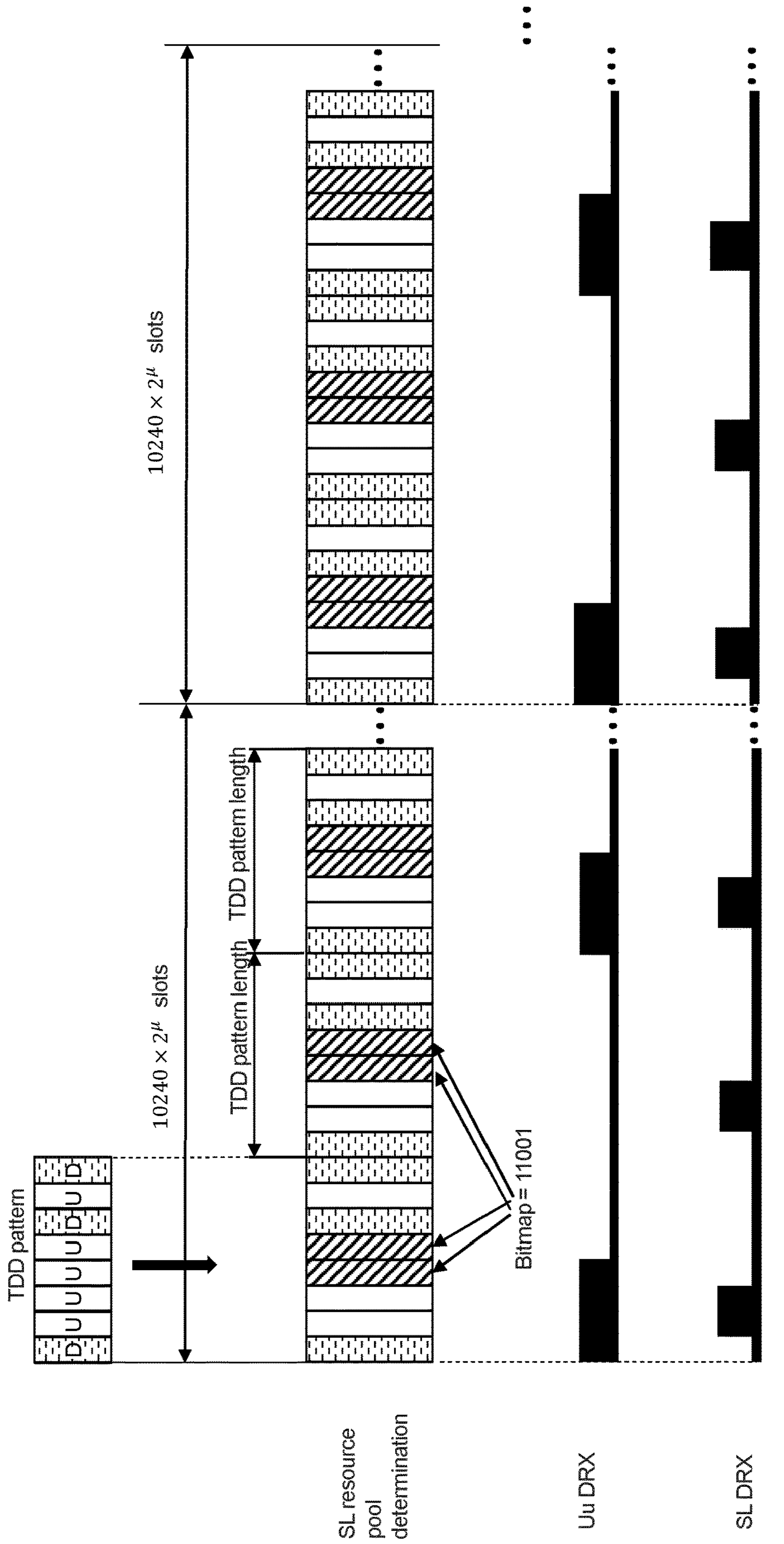

In the example illustrated by FIG. 7, k=2, n=m=1, X=8 corresponds to the length of the TDD pattern, and P is the SFN period of 10240 ms. The TDD pattern is "DUUUUDUD", and the bitmap for determining the slots of the SL resource pool is "11001". As can be seen, with these parameters the SL DRX cycle and the Uu DRX cycle are aligned according to Alignment Type 1.

Figure 8:
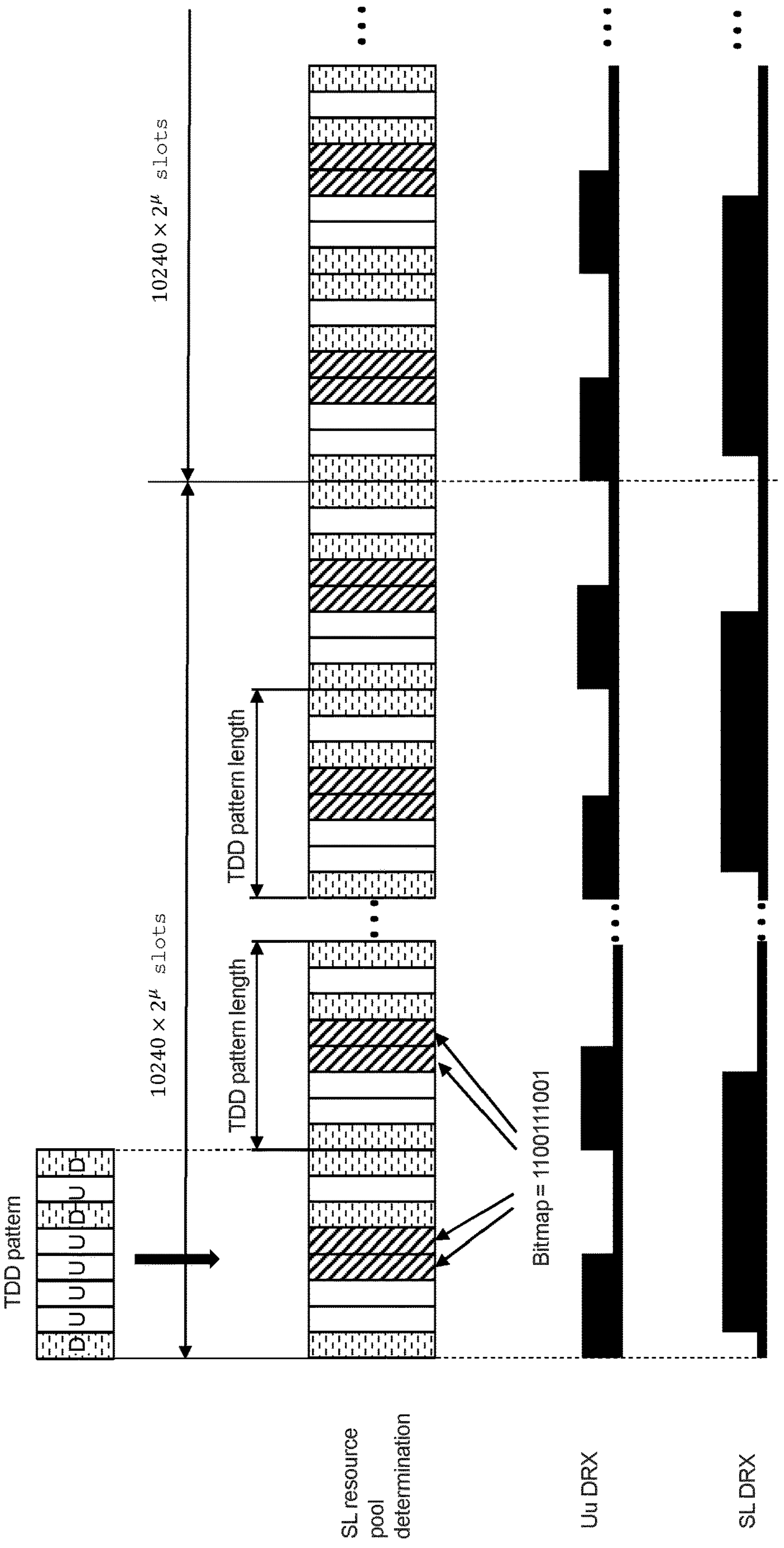

In the example illustrated by FIG. 8, k=1, n=2, m=1, X=8 corresponds to the length of the TDD pattern, and P is the SFN period of 10240 ms. The TDD pattern is "DUUUUDUD", and the bitmap for determining the slots of the SL resource pool is "1100111001". As can be seen, with these parameters the SL DRX cycle and the Uu DRX cycle are aligned according to Alignment Type 1.

Figure 9:
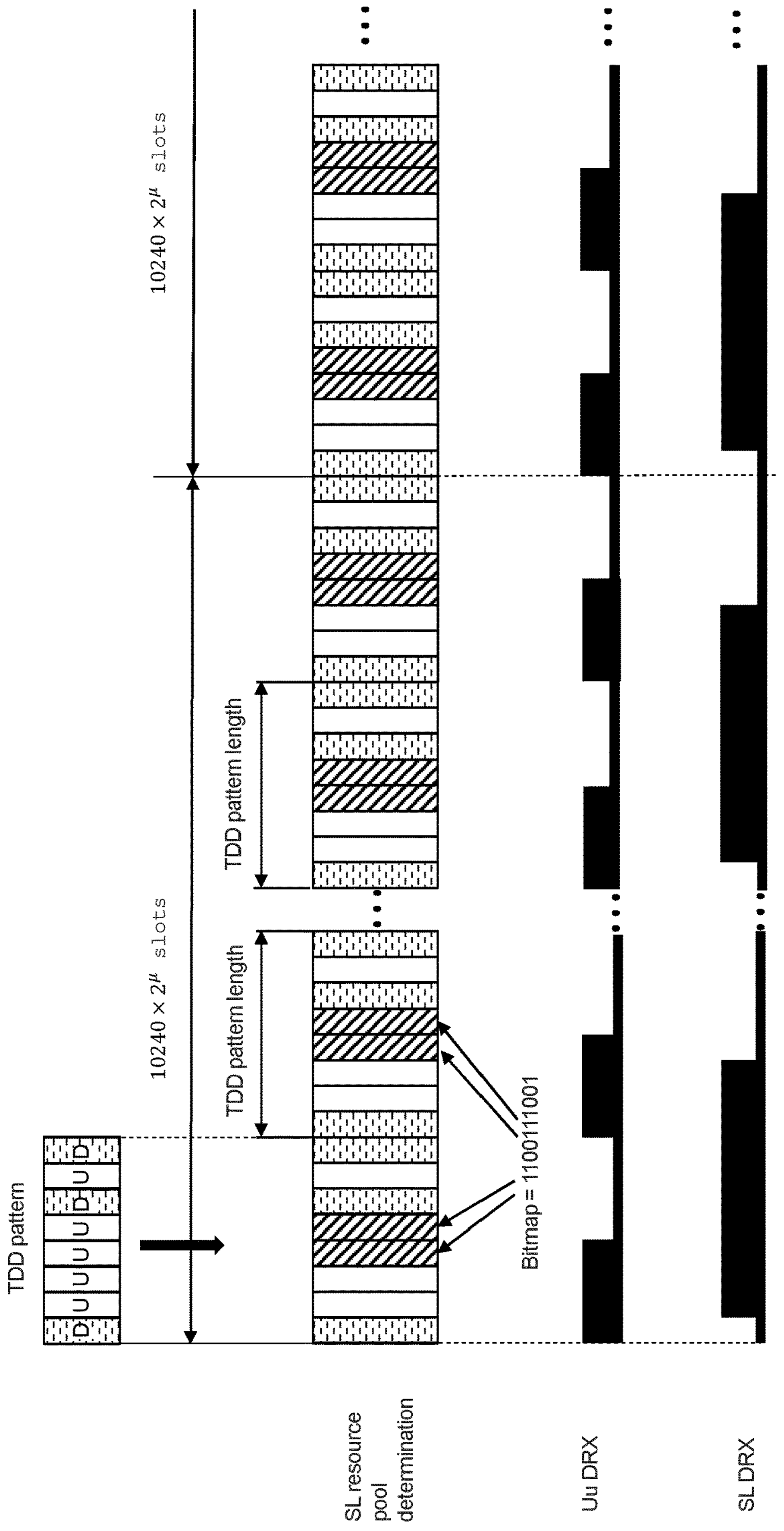

In the example illustrated by FIG. 9, k=1.5, n=2, m=1, X=8 corresponds to the length of the TDD pattern, and P is the SFN period of 10240 ms. The TDD pattern is "DUUUUDUD", and the bitmap for determining the slots of the SL resource pool is "1100111001". As can be seen, with these parameters the SL DRX cycle and the Uu DRX cycle are aligned according to Alignment Type 1.

Figure 10:
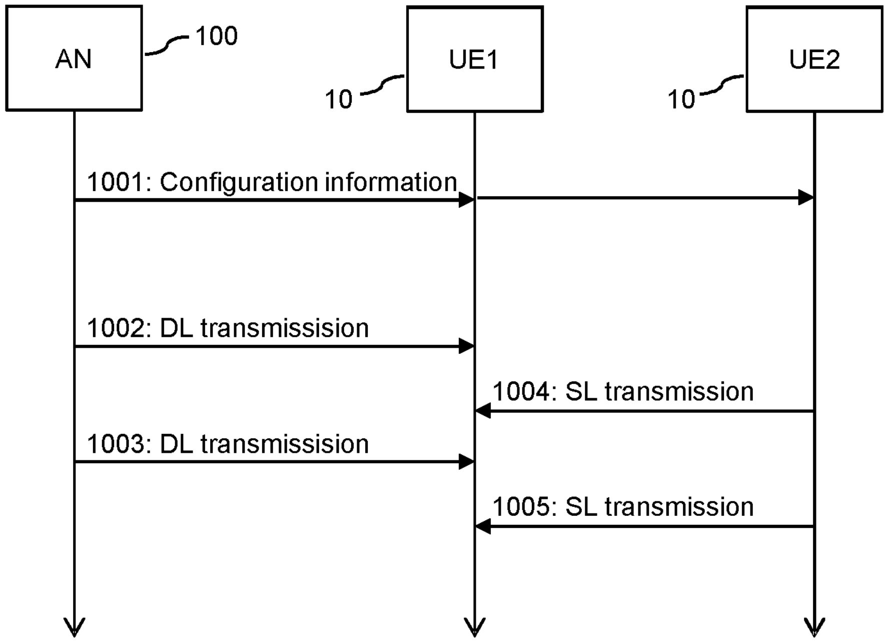
FIG. 10 schematically illustrates an example of processes according to an embodiment of the invention.

FIG. 10 illustrates an example of processes which are based on the above-concepts. The processes of FIG. 10 involve an access node (AN) 100, a first UE (UE1) 10, and a second UE (UE2) 10. The access node 100 and the UEs 10 may for example correspond to the access node 100 and any of the UEs 10 illustrated in FIG. 3 or 4.

In the example of FIG. 100, the access node 100 sends configuration information 1001, which is received by the UEs 10. The access node 100 may send at least a part of the configuration information 1001 in RRC signalling. Further, the access node 100 may send at least a part of the configuration information 1001 in broadcasted system information. In some scenarios, the configuration information could also be forwarded by the UEs 10, using one or more SL transmissions. For example, the first UE 10 could receive the configuration information from the access node 100 and forward at least a part of the configuration information to the second UE 10. The configuration information 1001 may indicate a setting of the lengths of the SL DRX cycle and of the Uu DRX cycle, as determined by the access node 100 based on applying the above-described principles.

As further illustrated, the first UE 10 receives DL transmissions 1002, 1003 from the access node 100. Further, the first UE 10 receives SL transmissions 1004, 1005 from the second UE 10. For this purpose, the first UE 10 applies a Uu DRX cycle and a SL DRX cycle which are aligned according to the above-described principles, by setting the lengths of the SL DRX cycle and the Uu DRX cycle according to the configuration information 1001 received from the access node 100.

It is noted that the processes of FIG. 10 are merely exemplary and that the functionalities for setting the lengths of the DRX cycles could at least in part also be implemented by the UE 10. For example, the configuration information 1001 could indicate the length of the Uu DRX cycle to the first UE 10, and the first UE 10 could set the length of the SL DRX cycle to achieve the alignment according to the above-described principles. Further, the first UE 10 could set lengths of the SL DRX cycle and of the Uu DRX cycle according to the above-described principles and then inform the access node 100 about these settings. Still further, the settings of the lengths of the SL DRX cycle and of the Uu DRX cycle according to the above-described principles could be based on negotiation between the access node 100 and the first UE 10.

Figure 11:
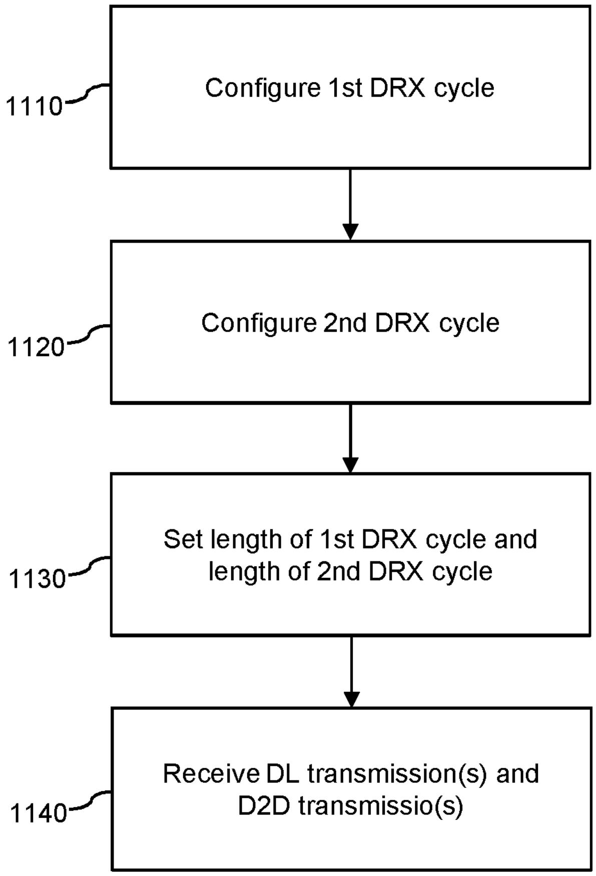
FIG. 11 shows a flowchart for schematically illustrating a method according to an embodiment of the invention.

FIG. 11 shows a flowchart for illustrating a method, which may be utilized for implementing the illustrated concepts. The method of FIG. 11 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 11 may be performed and/or controlled by one or more processors of the wireless communication device. Such wireless communication device may also include a memory storing program code for implementing at least some of the below described functionalities or steps of the method of FIG. 11.

At step 1110, the wireless communication device configures a first DRX cycle for DL communication with a wireless communication network. A length of the first DRX cycle is defined in terms of a number of slots in the time domain. The number of slots in the time domain may directly translate into an absolute time duration of the first DRX cycle, e.g., by applying a multiplicative factor corresponding to the duration of a single slot.

At step 1120, the wireless communication device configures a second DRX cycle for D2D communication. The D2D communication is performed on resources of at least one resource pool to which a subset of the slots is assigned. A length of the second DRX cycle is defined in terms of a number of the slots from the at least one resource pool.

In some scenarios, the second DRX cycle is for D2D communication performed on resources of multiple resource pools to which the subset of the slots is assigned. The length of the second DRX cycle may then be defined in terms of a number of the slots from the multiple resource pools. The multiple resource pools may for example be allocated to different services or applications. Further, the multiple resource pools could be allocated to different casting modes, such as unicast, groupcast, or multicast.

In some scenarios, the slots available to be assigned to the at least one resource pool exclude reserved slots, in particular slots reserved for transmission of synchronization signals, e.g., SL-SS or S-SSB, and/or slots reserved for other purposes.

At step 1130, the wireless communication device sets the length of the first DRX cycle and the length of the second DRX cycle under the condition that, for consecutive time periods of fixed length, each time period contains an integer number of the first DRX cycles and an integer number of the second DRX cycles. The fixed length of the time periods may correspond to a period of an SFN or to a period of a DFN.

In some scenarios, step 1130 may involve setting the lengths in such a way that, for each first DRX cycle, the number of the slots assigned to the resource pool remains the same.

In some scenarios, step 1130 may involve setting the lengths in such a way that a time duration of the second DRX cycle is an integer multiple of a time duration of the first DRX cycle. Alternatively, step 1130 may involve setting the lengths in such a way that a time duration of the first DRX cycle is an integer multiple of a time duration of the second DRX cycle. Alternatively, step 1130 may involve setting the lengths in such a way that a time duration of the first DRX cycle is an integer multiple of a time duration of the second DRX cycle plus an additive term. The additive term may depend on a configuration of reserved slots, in particular slots reserved for transmission of synchronization signals, e.g., SL-SS or S-SSB, and/or slots reserved for other purposes and thus not available to be assigned to the at least one resource pool. Further, the slots available to be assigned to the at least one resource pool exclude slots reserved for ensuring that the at least one resource pool is repeated an integer number of times in the time period, e.g., in an SFN period or in a DFN period.

In some scenario, the lengths may be set such that, for a first number X of consecutive slots in which a second number Y of slots is available to be assigned to the resource pool, and for a third number Z of slots that is assigned to the at least one resource pool from a fourth number n*Y of slots available to be assigned to the at least one resource pool, the length of the first DRX cycle is k*X and the length of the second DRX cycle is m*Z, with k, m, and n being fractional numbers. In some scenarios, k, m, and n are integer numbers. In some scenarios, k, m, and n are equal. In some scenarios, are at least two of k, m, and n are different. In some scenarios, k is selected in such a way that the length of the first DRX cycle is equal to or shorter than the length of the time period. In some scenarios, k, m, and n are selected in such a way that, within one of the time periods, a start of the first DRX cycle coincides at least once with a start of the second DRX cycle. In some scenarios, the first number X of consecutive slots corresponds to a length of a TDD pattern for periodically switching between DL and UL communication. In some scenarios, the third number n*Y of the available slots corresponds to a length of a bitmap for assigning slots to the at least one resource pool.

At step 1140, the wireless communication device may apply the first DRX cycle for receiving at least one DL transmission from a node of the wireless communication network and apply the second DRX cycle for receiving at least one D2D transmission from another wireless communication device, e.g., like explained for the DL transmissions 1002, 1003 and the SL transmissions 1004, 1005 in the example of FIG. 10.

Figure 12:
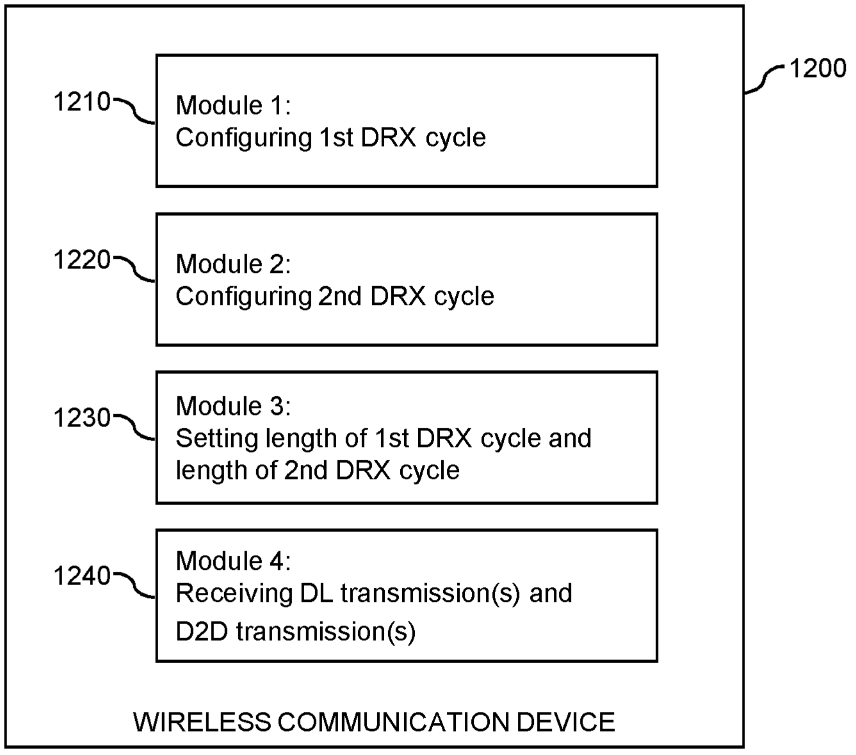
FIG. 12 shows an exemplary block diagram for illustrating functionalities of a wireless communication device implementing functionalities corresponding to the method of FIG. 7.

FIG. 12 shows a block diagram for illustrating functionalities of a wireless communication device 1200 which operates according to the method of FIG. 11. The wireless communication device 1200 may for example correspond to any of the above-mentioned UEs 10. As illustrated, the wireless communication device 1200 may be provided with a module 1210 configured to configure a first DRX cycle for DL communication, such as explained in connection with step 1110. Further, the wireless communication device 1200 device may be provided with a module 1220 configured to configure a second DRX cycle for UL communication, such as explained in connection with step 1120. Further, the wireless communication device 1200 may be provided with a module 1230 configured to set the length of the first DRX cycle and the length of the second DRX cycle, such as explained in connection with step 1130. Further, the wireless communication device 1200 may be provided with a module 1240 configured to receive at least one DL transmission and at least one UL transmission, such as explained in connection with step 1140.

It is noted that the wireless communication device 1200 may include further modules for implementing other functionalities, such as known functionalities of a UE in the LTE and/or NR radio technology. Further, it is noted that the modules of the wireless communication device 1200 do not necessarily represent a hardware structure of the wireless communication device 1200, but may also correspond to functional elements, e.g., implemented by hardware, software, or a combination thereof.

Figure 13:
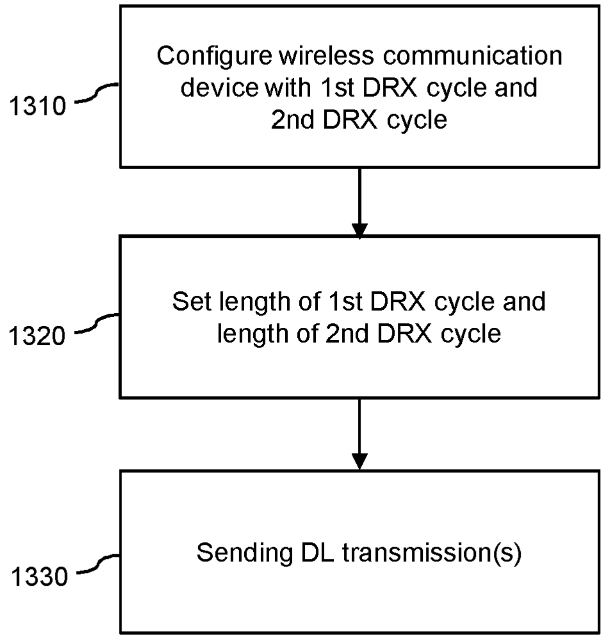
FIG. 13 shows a flowchart for schematically illustrating a further method according to an embodiment of the invention.

FIG. 13 shows a flowchart for illustrating a method, which may be utilized for implementing the illustrated concepts. The method of FIG. 13 may be used for implementing the illustrated concepts in a node of a wireless communication network, e.g., corresponding to the above-mentioned access node 100.

If a processor-based implementation of the node is used, at least some of the steps of the method of FIG. 13 may be performed and/or controlled by one or more processors of the node. Such node may also include a memory storing program code for implementing at least some of the below described functionalities or steps of the method of FIG. 13.

At step 1310, the node configures a wireless communication device with a first DRX cycle for DL communication with the wireless communication network and a second DRX cycle for D2D communication. A length of the first DRX cycle is defined in terms of a number of slots in the time domain. The number of slots in the time domain may directly translate into an absolute time duration of the first DRX cycle, e.g., by applying a multiplicative factor corresponding to the duration of a single slot. The D2D communication is performed on resources of at least one resource pool to which a subset of the slots is assigned. A length of the second DRX cycle is defined in terms of a number of the slots from the at least one resource pool.

In some scenarios, the second DRX cycle is for D2D communication performed on resources of multiple resource pools to which the subset of the slots is assigned. The length of the second DRX cycle may then be defined in terms of a number of the slots from the multiple resource pools. The multiple resource pools may for example be allocated to different services or applications. Further, the multiple resource pools could be allocated to different casting modes, such as unicast, groupcast, or multicast.

In some scenarios, the slots available to be assigned to the at least one resource pool exclude reserved slots, in particular slots reserved for transmission of synchronization signals, e.g., SL-SS or S-SSB, and/or slots reserved for other purposes.

Step 1310 may involve that the node sends configuration information to the wireless communication device, e.g., using RRC signalling or broadcasted system information, such as explained for the configuration information 1001 in the example of FIG. 10.

At step 1320, the node sets the length of the first DRX cycle and the length of the second DRX cycle under the condition that, for consecutive time periods of fixed length, each time period contains an integer number of the first DRX cycles and an integer number of the second DRX cycles. The fixed length of the time periods may correspond to a period of an SFN or to a period of a DFN.

In some scenarios, step 1320 may involve setting the lengths in such a way that, for each first DRX cycle, the number of the slots assigned to the resource pool remains the same.

In some scenarios, step 1320 may involve setting the lengths in such a way that a time duration of the second DRX cycle is an integer multiple of a time duration of the first DRX cycle. Alternatively, step 1320 may involve setting the lengths in such a way that a time duration of the first DRX cycle is an integer multiple of a time duration of the second DRX cycle. Alternatively, step 1130 may involve setting the lengths in such a way that a time duration of the first DRX cycle is an integer multiple of a time duration of the second DRX cycle plus an additive term. The additive term may depend on a configuration of reserved slots, in particular slots reserved for transmission of synchronization signals, e.g., SL-SS or S-SSB, and/or slots reserved for other purposes and thus not available to be assigned to the at least one resource pool. Further, the slots available to be assigned to the at least one resource pool exclude slots reserved for ensuring that the at least one resource pool is repeated an integer number of times in the time period, e.g., in an SFN period or in a DFN period.

In some scenario, the lengths may be set such that, for a first number X of consecutive slots in which a second number Y of slots is available to be assigned to the resource pool, and for a third number Z of slots that is assigned to the at least one resource pool from a fourth number n*Y of slots available to be assigned to the at least one resource pool, the length of the first DRX cycle is k*X and the length of the second DRX cycle is m*Z, with k, m, and n being fractional numbers. In some scenarios, k, m, and n are integer numbers. In some scenarios, k, m, and n are equal. In some scenarios, are at least two of k, m, and n are different. In some scenarios, k is selected in such a way that the length of the first DRX cycle is equal to or shorter than the length of the time period. In some scenarios, k, m, and n are selected in such a way that, within one of the time periods, a start of the first DRX cycle coincides at least once with a start of the second DRX cycle. In some scenarios, the first number X of consecutive slots corresponds to a length of a TDD pattern for periodically switching between DL and UL communication. In some scenarios, the third number n*Y of the available slots corresponds to a length of a bitmap for assigning slots to the at least one resource pool.

Step 1320 may involve that the node sends configuration information to the wireless communication device, e.g., using RRC signalling or broadcasted system information, such as explained for the configuration information 1001 in the example of FIG. 10. The configuration information may indicate the lengths of the DRX cycles set at step 1320.

At step 1330, the node may send at least one DL transmission to the wireless communication device. Here, the node may control the sending of the DL transmission based on the first DRX cycle applied by the wireless communication device, e.g., by sending the at least one DL transmission in an active time of the first DRX cycle.

Figure 14:
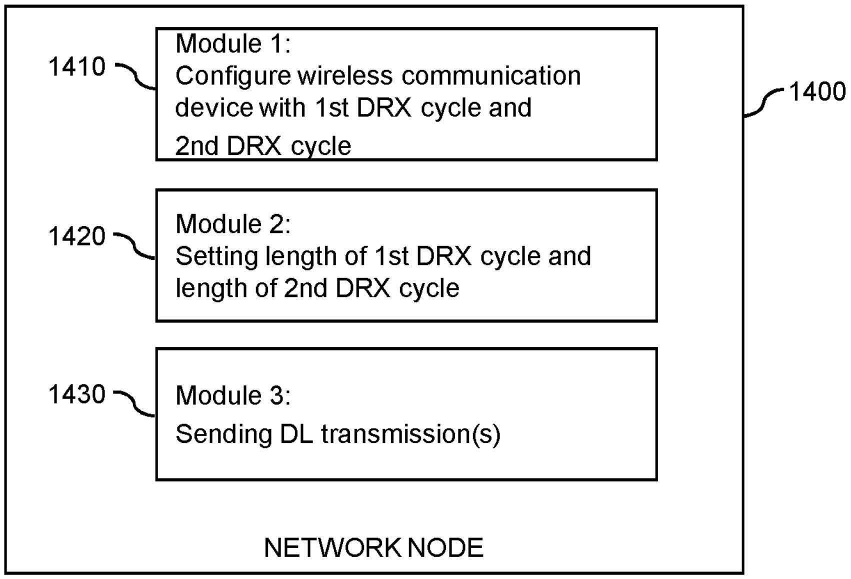
FIG. 14 shows an exemplary block diagram for illustrating functionalities of a network node implementing functionalities corresponding to the method of FIG. 9.

FIG. 14 shows a block diagram for illustrating functionalities of node 1400 for a wireless communication network which operates according to the method of FIG. 13. The node 1400 may for example correspond to any of the above-mentioned access nodes. As illustrated, the node 1400 may be provided with a module 1410 configured to configure a wireless communication device with a first DRX cycle and a second DRX cycle, such as explained in connection with step 1310. Further, the node 1400 may be provided with a module 1320 configured to set lengths of the first DRX cycle and the second DRX cycle, such as explained in connection with step 1320. Further, the node 1400 may be provided with a module 1430 configured send at least one DL transmission, such as explained in connection with step 1330.

It is noted that the node 1400 may include further modules for implementing other functionalities, such as known functionalities of a eNB in the LTE technology and/or a gNB in the NR technology. Further, it is noted that the modules of the node 1400 do not necessarily represent a hardware structure of the node 1400, but may also correspond to functional elements, e.g., implemented by hardware, software, or a combination thereof.

It is to be understood that the functionalities as described in connection with FIGS. 11 to 14 may also be combined in various ways, e.g., in a system which includes at least one wireless communication device operating according to the method of FIG. 11 and a node operating according to the method of FIG. 13.

Figure 15:
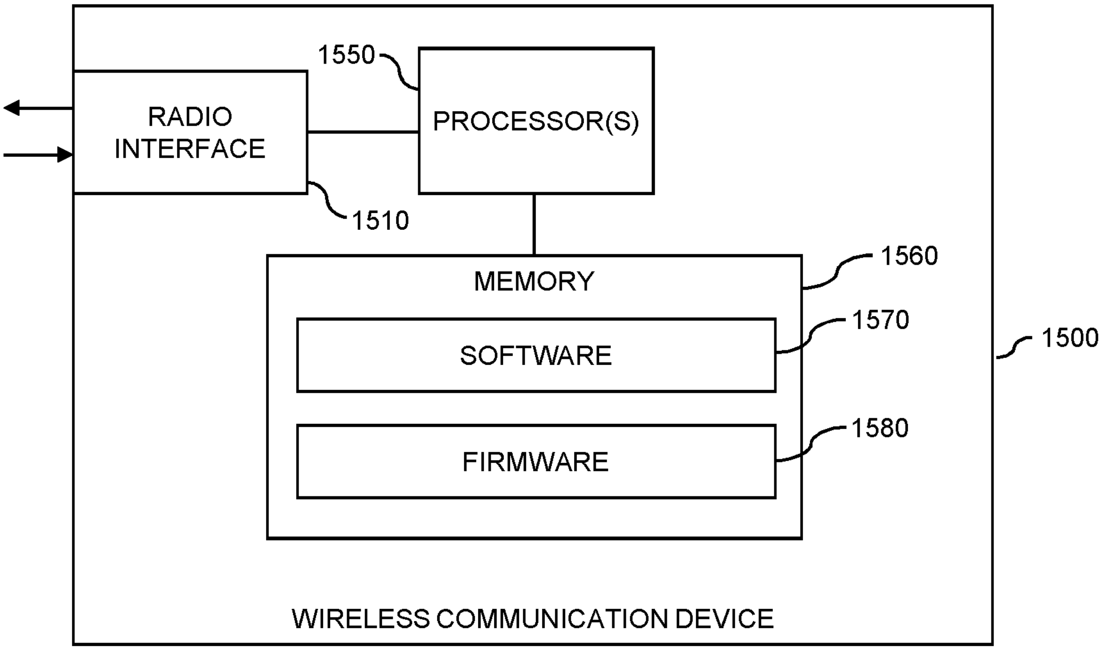
FIG. 15 schematically illustrates structures of a wireless communication device according to an embodiment of the invention.

FIG. 15 illustrates a processor-based implementation of a wireless communication device 1500 which may be used for implementing the above-described concepts. For example, the structures as illustrated in FIG. 15 may be used for implementing the concepts in any of the above-mentioned UEs.

As illustrated, the wireless communication device 1500 includes one or more radio interfaces 1510. The radio interface(s) 1510 may for example be based on the NR technology or the LTE technology. The radio interface(s) 1510 may support D2D communication, e.g., using SL communication as specified for the NR technology or the LTE technology.

Further, the wireless communication device 1500 may include one or more processors 1550 coupled to the radio interface(s) 1510 and a memory 1560 coupled to the processor(s) 1550. By way of example, the radio interface(s) 1510, the processor(s) 1550, and the memory 1560 could be coupled by one or more internal bus systems of the wireless communication device 1500. The memory 1560 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1560 may include software 1570 and/or firmware 1580. The memory 1560 may include suitably configured program code to be executed by the processor(s) 1550 so as to implement the above-described functionalities for controlling D2D communication, such as explained in connection with FIG. 11 or 12.

It is to be understood that the structures as illustrated in FIG. 15 are merely schematic and that the wireless communication device 1500 may actually include further components which, for the sake of clarity, have not been illustrated, e.g., further interfaces, such as a dedicated management interface, or further processors. Also, it is to be understood that the memory 1560 may include further program code for implementing known functionalities of a UE. According to some embodiments, also a computer program may be provided for implementing functionalities of the wireless communication device 1500, e.g., in the form of a physical medium storing the program code and/or other data to be stored in the memory 1560 or by making the program code available for download or by streaming.

Figure 16:
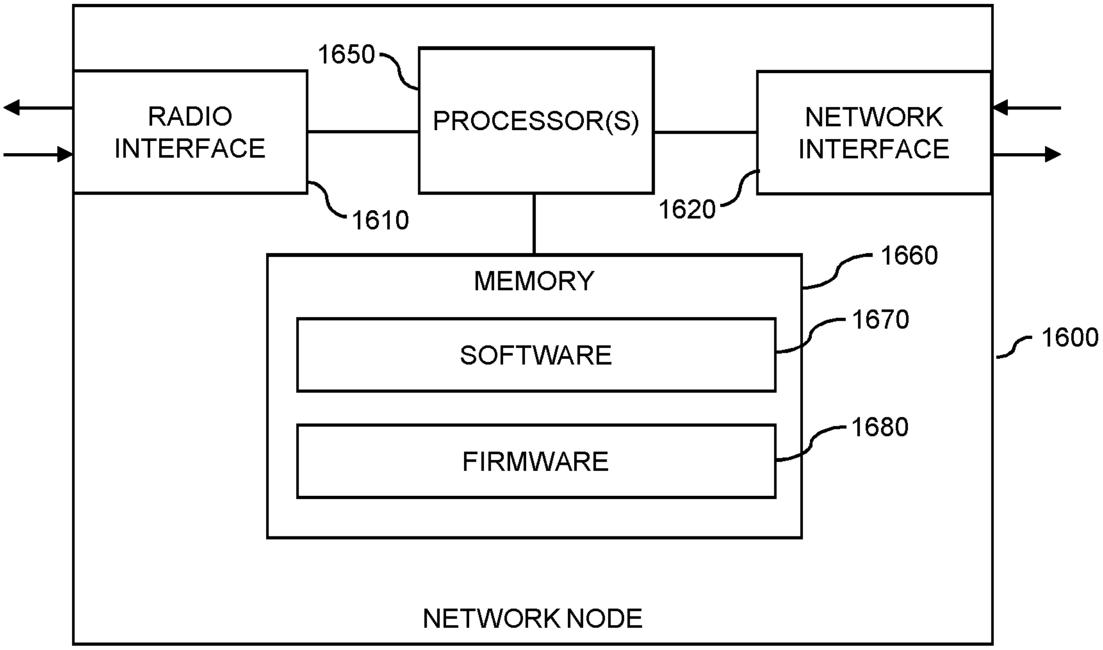
FIG. 16 schematically illustrates structures of a network node according to an embodiment of the invention.

FIG. 16 illustrates a processor-based implementation of a node 1600 for a wireless communication network, which may be used for implementing the above-described concepts.

For example, the structures as illustrated in FIG. 16 may be used for implementing the concepts in the above-mentioned access node 100.

As illustrated, the node 1600 may include one or more radio interfaces 1610. The radio interface(s) 1610 may for example be based on the NR technology or the LTE technology. The radio interface(s) 1610 may be used for controlling or configuring wireless communication devices, such as any of the above-mentioned UEs 10. In addition, the node 1600 may include one or more network interfaces 1620. The network interface(s) 1620 may for example be used for communication with one or more other nodes of the wireless communication network. Also the network interface(s) 1620 may be used for controlling wireless communication devices, such as any of the above-mentioned UEs 10, e.g., by receiving corresponding control information from other network nodes.

Further, the node 1600 may include one or more processors 1650 coupled to the interface(s) 1610, 1620 and a memory 1660 coupled to the processor(s) 1650. By way of example, the interface(s) 1610, the processor(s) 1650, and the memory 16260 could be coupled by one or more internal bus systems of the node 1600. The memory 1660 may include a ROM, e.g., a flash ROM, a RAM, e.g., a DRAM or SRAM, a mass storage, e.g., a hard disk or solid state disk, or the like. As illustrated, the memory 1660 may include software 1670 and/or firmware 1680. The memory 1660 may include suitably configured program code to be executed by the processor(s) 1650 so as to implement the above-described functionalities for controlling D2D communication, such as explained in connection with FIGS. 13 and 14.

It is to be understood that the structures as illustrated in FIG. 16 are merely schematic and that the wireless communication device 1600 may actually include further components which, for the sake of clarity, have not been illustrated, e.g., further interfaces, such as a dedicated management interface, or further processors. Also, it is to be understood that the memory 1660 may include further program code for implementing known functionalities of an eNB or of a gNB. According to some embodiments, also a computer program may be provided for implementing functionalities of the node 1600, e.g., in the form of a physical medium storing the program code and/or other data to be stored in the memory 1660 or by making the program code available for download or by streaming.

As can be seen, the concepts as described above may be used for performing D2D communication in an energy efficient manner. In particular, the concepts may be used for coordinating DRX operation for DL communication and DRX operation for D2D communication, so that the overall power saving possibilities can be improved.

It is to be understood that the examples and embodiments as explained above are merely illustrative and susceptible to various modifications. For example, the illustrated concepts may be applied in connection with various kinds of radio technologies and D2D communication, without limitation the SL mode of the LTE technology or NR technology, e.g., in connection with WLAN technologies or other wireless ad-hoc network technologies. Further, the concepts may be applied with respect to various types of UEs, without limitation to vehicle-based UEs. Further, the concepts may be applied in connection with various services supported by D2D communication. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling device-to-device (D2D) communication, the method comprising:

configuring with a wireless communication device a first discontinuous reception (DRX) cycle for downlink communication with a wireless communication network, a length of the first DRX cycle being defined in terms of a number of slots in the time domain;

configuring with the wireless communication device a second DRX cycle for device-to-device (D2D) communication performed on resources of at least one resource pool to which a subset of the slots is assigned, a length of the second DRX cycle being defined in terms of a number of the slots from the at least one resource pool; and setting with the wireless communication device the length of the first DRX cycle and the length of the second DRX cycle under the condition that, for consecutive time periods of fixed length, each time period contains an integer number of the first DRX cycles and an integer number of the second DRX cycles, a time duration of the first DRX cycle being an integer multiple of a time duration of the second DRX cycle plus an additive term, the additive term depending on a configuration of slots reserved for transmission of synchronization signals.

2. The method of claim 1, wherein, for a first number X of consecutive slots in which a second number Y of slots is available to be assigned to the at least one resource pool, and for a third number Z of slots that is assigned to the at least one resource pool from a fourth number n*Y of slots available to be assigned to the at least one resource pool, the length of the first DRX cycle is k*X and the length of the second DRX cycle is m*Z, wherein:

k is selected in such a way that the length of the first DRX cycle is equal to or shorter than the length of the time period, and/or k, m, and n are selected in such a way that, within one of the time periods, a start of the first DRX cycle coincides at least once with a start of the second DRX cycle.

3. The method of claim 2, wherein the first number X of consecutive slots corresponds to a length of a time-division duplex (TDD) pattern for periodically switching between downlink and uplink communication, and/or wherein the third number n*Y of the available slots corresponds to a length of a bitmap for assigning slots to the resource pool.

4. The method of claim 1, wherein the fixed length of the time periods corresponds to a period of a system frame number, or wherein the fixed length of the time periods corresponds to a period of a direct frame number.

5. The method of claim 1, wherein the second DRX cycle is for D2D communication performed on resources of multiple resource pools to which the subset of the slots is assigned, the length of the second DRX cycle being defined in terms of a number of the slots from the multiple resource pools.

6. The method of claim 1, wherein the slots available to be assigned to at least one resource pool exclude slots reserved for transmission of synchronization signals.

7. The method of claim 1, wherein the slots available to be assigned to the at least one resource pool exclude slots reserved for ensuring that the at least one resource pool is repeated an integer number of times in the time period.

8. The method of claim 1, comprising:

based on the first DRX cycle, receiving with the wireless communication device at least one downlink transmission from a node of the wireless communication network; and based on the second DRX cycle, receiving with the wireless communication device at least one D2D transmission from another wireless communication device.

9. A method of controlling device-to-device (D2D) communication, the method comprising:

configuring with a node of a wireless communication network a wireless communication device with a first discontinuous reception (DRX) cycle for downlink communication with the wireless communication network and a second DRX cycle for device-to-device (D2D) communication, a length of the first DRX cycle being defined in terms of a number of slots in the time domain, the D2D communication being performed on resources of at least one resource pool to which a subset of the slots is assigned, and a length of the second DRX cycle being defined in terms of a number of the slots from the at least one resource pool; and setting with the node the length of the first DRX cycle and the length of the second DRX cycle under the condition that, for consecutive time periods of fixed length, each time period contains an integer number of the first DRX cycles and an integer number of the second DRX cycles, a time duration of the first DRX cycle being an integer multiple of a time duration of the second DRX cycle plus an additive term, the additive term depending on a configuration of slots reserved for transmission of synchronization signals.

10. The method of claim 9, wherein, for a first number X of consecutive slots in which a second number Y of slots is available to be assigned to the at least one resource pool, and for a third number Z of slots that is assigned to the at least one resource pool from a fourth number n*Y of slots available to be assigned to the at least one resource pool, the length of the first DRX cycle is k*X and the length of the second DRX cycle is m*Z, wherein:

k is selected in such a way that the length of the first DRX cycle is equal to or shorter than the length of the time period, and/or k, m, and n are selected in such a way that, within one of the time periods, a start of the first DRX cycle coincides at least once with a start of the second DRX cycle.

11. The method of claim 10, wherein the first number X of consecutive slots corresponds to a length of a time-division duplex, TDD, pattern for periodically switching between downlink and uplink communication, and/or wherein the third number n*Y of the available slots corresponds to a length of a bitmap for assigning slots to the resource pool.

12. The method of claim 9, wherein the fixed length of the time periods corresponds to a period of a system frame number, or wherein the fixed length of the time periods corresponds to a period of a direct frame number.

13. The method of claim 9, wherein the second DRX cycle is for D2D communication performed on resources of multiple resource pools to which the subset of the slots is assigned, the length of the second DRX cycle being defined in terms of a number of the slots from the multiple resource pools.

14. The method of claim 9, wherein the slots available to be assigned to the at least one resource pool exclude slots reserved for ensuring that the at least one resource pool is repeated an integer number of times in the time period.

15. A wireless communication device, the wireless communication device comprising:

at least one processor, and a memory containing program code executable by the at least one processor, the program code being configured so that execution of the program code by the at least one processor causes the wireless communication device to:

configure a first discontinuous reception (DRX) cycle for downlink communication with a wireless communication network, a length of the first DRX cycle being defined in terms of a number of slots in the time domain;

configure a second DRX cycle for device-to-device (D2D) communication performed on resources of at least one resource pool to which a subset of the slots is assigned, a length of the second DRX cycle being defined in terms of a number of the slots from the at least one resource pool; and the wireless communication device setting the length of the first DRX cycle and the length of the second DRX cycle under the condition that, for consecutive time periods of fixed length, each time period contains an integer number of the first DRX cycles and an integer number of the second DRX cycles, a time duration of the first DRX cycle being an integer multiple of a time duration of the second DRX cycle plus an additive term, the additive term depending on a configuration of slots reserved for transmission of synchronization signals.

16. A node for a wireless communication network, the node comprising:

at least one processor, and a memory containing program code executable by the at least one processor, the program code being configured so that execution of the program code by the at least one processor causes the wireless node to:

configure a wireless communication device with a first discontinuous reception (DRX) cycle for downlink communication with the wireless communication network and a second DRX cycle for device-to-device (D2D) communication, a length of the first DRX cycle being defined in terms of a number of slots in the time domain, the D2D communication being performed on resources of at least one resource pool to which a subset of the slots is assigned, and a length of the second DRX cycle being defined in terms of a number of the slots from the at least one resource pool; and set the length of the first DRX cycle and the length of the second DRX cycle under the condition that, for consecutive time periods of fixed length, each time period contains an integer number of the first DRX cycles and an integer number of the second DRX cycles, a time duration of the first DRX cycle being an integer multiple of a time duration of the second DRX cycle plus an additive term, the additive term depending on a configuration of slots reserved for transmission of synchronization signals.

* * * * *